US010826888B2

(12) United States Patent
Song et al.

(10) Patent No.: US 10,826,888 B2
(45) Date of Patent: Nov. 3, 2020

(54) METHOD FOR PROVIDING CERTIFICATE SERVICE BASED ON SMART CONTRACT AND SERVER USING THE SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 127 days.

(21) Appl. No.: 15/782,132

(22) Filed: Oct. 12, 2017

(65) Prior Publication Data

US 2018/0109516 A1    Apr. 19, 2018

(30) Foreign Application Priority Data

Oct. 13, 2016  (KR) .......................... 10-2016-0132685

(51) Int. Cl.
*H04L 29/06* (2006.01)
*H04L 9/32* (2006.01)
(Continued)

(52) U.S. Cl.
CPC ........ *H04L 63/0823* (2013.01); *H04L 9/3239* (2013.01); *H04L 9/3263* (2013.01);
(Continued)

(58) Field of Classification Search
CPC . H04L 63/0823; H04L 9/3239; H04L 9/3263; H04L 9/3268; H04L 2209/38; H04W 12/06; H04W 12/10
See application file for complete search history.

(56) References Cited

U.S. PATENT DOCUMENTS

2016/0275461 A1 * 9/2016 Sprague ............ G06Q 20/0655
2016/0335533 A1 * 11/2016 Davis ........................ G06F 9/44
(Continued)

FOREIGN PATENT DOCUMENTS

| KR | 10-0411448 | 12/2003 |
| KR | 10-1575030 B1 | 12/2015 |
| KR | 10-1637854 B1 | 7/2016 |

OTHER PUBLICATIONS

Wikipedia, ActiveX.
(Continued)

*Primary Examiner* — Eleni A Shiferaw
*Assistant Examiner* — Bassam A Noaman
(74) *Attorney, Agent, or Firm* — Husch Blackwell LLP

(57) ABSTRACT

A method for providing a certificate registration service based on a smart contract, wherein the smart contract is source code compilable into executable byte code, is configured to perform procedures if particular conditions are satisfied, and wherein integrity is verified by a consensus, is provided. The method includes steps of: (a) acquiring a public key (PubA) of a user device, an (IdhashA) which is hashed personal information, and a (VcertA) which includes validity conditions, acquiring the smart contract corresponding to the validity conditions and byte code; (b) registering the PubA, the IdhashA and the byte code with a private blockchain database, and acquiring locating certificate information (PrivTxidA) in the private blockchain database; (c) registering the PrivTxidA and a state of the smart contract with State Database (SDB); and (d) acquiring and registering a hash value calculated using the PubA, the IdhashA and the byte code, and its neighboring hash value.

47 Claims, 8 Drawing Sheets

(51) Int. Cl.
    *H04W 12/06* (2009.01)
    *H04W 12/10* (2009.01)
(52) U.S. Cl.
    CPC ........ *H04L 9/3268* (2013.01); *H04L 2209/38* (2013.01); *H04W 12/06* (2013.01); *H04W 12/10* (2013.01)

(56) References Cited

U.S. PATENT DOCUMENTS

2017/0155515 A1* 6/2017 Androulaki ............. G06F 21/64
2017/0301047 A1* 10/2017 Brown ................... G06Q 50/18
2017/0352027 A1* 12/2017 Zhang ................... H04L 9/0825
2018/0082256 A1* 3/2018 Tummuru ........... G06Q 10/1053
2018/0082296 A1* 3/2018 Brashers ............. G06Q 20/405
2018/0343114 A1* 11/2018 Ben-Ari ................. G06F 21/64

OTHER PUBLICATIONS

Remarks by the President at the New Years Press Conference; http://www.korea.net/Government/Briefing-Room/Presidential-Speeches/view?articleId=125657, Jan. 12, 2015.
Olavsrud, How Blockchain will disrupt your business, Sep. 5, 2016, CIO.

* cited by examiner

FIG. 5

```
contract useCounter{
    int counter;
    function useCounter(int initNumber){
        counter = initNumber;
    }
    function decrease() constant returns (int){
        counter -= 1;
        return counter;
    }
}
```

FIG. 6

```
contract useCounter{
   int counter;
   function useCounter(){
      counter = 10;
   }
   function decrease() constant returns (int){
      counter -= 1;
      return counter;
   }
}
```

METHOD FOR PROVIDING CERTIFICATE SERVICE BASED ON SMART CONTRACT AND SERVER USING THE SAME

CROSS REFERENCE TO RELATED APPLICATION

This application claims priority to and incorporates herein by reference all disclosure in Korean patent application no. 10-2016-0132685 filed Oct. 13, 2016

FIELD OF THE INVENTION

The present invention relates to a method for providing a registration service of a specific certificate based on a specific smart contract; and more particularly, to the method of (a) an intermediate server performing a process of, if (i) a specific public key PubA corresponding to a user device of a specific user, (ii) an IdhashA which is a hash value of personal information of the specific user, and (iii) a VcertA which includes one or more validity conditions on the specific certificate, are acquired, creating the specific smart contract SC(VcertA) corresponding to the validity conditions, and a process of acquiring at least one specific byte code BC(SC(VcertA)) into which the specific smart contract is compiled; (b) the intermediate server performing a process of, if the specific byte code is acquired, registering the specific public key PubA, the IdhashA and the specific byte code BC(SC(VcertA)) as information of the specific certificate with a private blockchain database, and acquiring PrivTxidA as referential information of the specific certificate, which is a locator of the information of the specific certificate in the private blockchain database; (c) the intermediate server performing a process of, if the PrivTxidA is acquired, setting a specific state S(SC(VcertA)) of the specific smart contract SC(VcertA) as an initial state, and registering the PrivTxidA and the specific state S(SC(VcertA)) with an SDB; and (d) the intermediate server performing (d-1) a process of, if one or more anchoring conditions for an n-th block of a blockchain in the private blockchain database are satisfied, acquiring a specific representative hash value or its processed value calculated by using a specific hash value and its corresponding at least one neighboring hash value to be recorded in the n-th block with the specific hash value, where the specific hash value is calculated by using the specific public key PubA, the IdhashA and the specific byte code BC(SC(VcertA)), and where the neighboring hash value includes at least one of (i) at least one first associated hash value calculated by using at least one associated public key, at least one Idhash_OTHERS which is a hash value of personal information of at least one of other users and at least one associated byte code into which at least one associated smart contract is compiled, (ii) at least one second associated hash value calculated by using (ii-1) at least one message data which includes approval information or its processed value corresponding to an approval of at least one associated certificate, or revocation requesting information or its processed value corresponding to a revocation of the associated certificate, where the associated certificate is referred to by at least one PrivTxid_OTHERS which is at least one locator of at least one associated transaction, (ii-2) at least one signature value of the message data, and (ii-3) the PrivTxid_OTHERS, and (iii) at least one third associated hash value of the SDB or of all variations of the SDB, where (iii-1) all the variations of the SDB include all respective changes of all states of all smart contracts, and correspond to differences between states of the SDB at the time of completion of the n-th block and states of the SDB at the time of completion of an (n−1)-th block of the blockchain in the private blockchain database, (iii-2) the states of the SDB are identifiable by all PrivTxids which represent all respective location information on where their corresponding all transactions are recorded in the n-th block, and (iii-3) the SDB includes information on the specific state and at least one associated state of the associated smart contract, and (d-2) a process of registering the specific representative hash value or its processed value with a public blockchain database, and the intermediate server using the same.

BACKGROUND OF THE INVENTION

Thanks to development of IT, a variety of services based on the Internet are used by people of all ages regardless of places.

In other words, various services in a diversity of industrial fields including financial services such as a wire transfer or stock trading by accessing servers operated by banks or securities firms, civil services such as issuing copies of resident registration and other various credentials by accessing servers operated by governmental bodies, and e-commerce services for purchasing goods by accessing servers for selling goods can be provided in real time through the Internet.

Meanwhile, to use services in such various industrial fields, authentications verifying identities of users, as customers, are performed, at which time certificates are used.

Herein, a certificate is electronic information issued by a certification authority (CA) for the purpose of confirming an identity of a user, and preventing transaction denials or forgery and falsification of a document upon the use of services in the various industrial fields, representing a kind of certificate of seal impression for a digital transaction. Such a certificate contains a version, a serial number, an effective period, an issuing institution of the certificate, information on verification of an e-signature of a user, a user's name, information on identification confirmation, an e-signature method, etc.

The certificate is used in a public key infrastructure (PKI) as a standard security method.

The public key infrastructure (PKI) is a set of roles, policies, and procedures needed to create, manage, distribute, use, store, and revoke certificates and manage public key encryption.

As a user's private key exists in a form of a file at a storing location standardized by a soft token-based storing method in the PKI, it is easy to copy and automatically collect a file of the private key and this has a risk of financial damages and user information theft caused by a leaked private key.

Since, for this reason, the CA must implement a certificate issuing system connected with an advanced security system to prevent any hacking as much as possible and perform the operation and maintenance of the implemented certificate issuing system, there has been a problem of incurring a lot of costs of issuing the certificate.

Besides, when a user authentication process using the certificate is performed through a web browser, a separate security module is required, for example, an ActiveX control must be installed in advance.

As such, the ActiveX control compulsorily installed during the course of user authentication is software created by Microsoft as a technology used to develop reusable object-oriented software elements. By applying component object models and object linking and embedding (OLE), it is used to make contents downloadable from world-wide web (WWW). Most ActiveX controls are used to make plugins for the Internet Explorer (IE).

To install the ActiveX controls on a personal computer (PC), a security level of the PC must be lowered for the ActiveX controls to access resources including files, registry, etc. Due to the lowered security level of the user's PC caused by the Active X controls, the PC becomes vulnerable to the dangerous environment such as hacking and the process of performing public certification becomes complicated.

For these reasons, the South Korean government is executing a policy of removing Active X controls. For example, the South Korean President called Active X controls as typical of the outdated regulations, at the New Year's press conference to domestic and foreign reporters and journalists in 2015.

Furthermore, the certificates which require the installation of the Active X controls can be used only with the IE provided by MICROSOFT but not in any other web browsers such as CHROME, SAFARI, and FIREFOX.

In short, when users intend to use the certificates for user authentication with services in a variety of industrial fields including financial services, civil services, and e-commerce services as mentioned above, the users of the IE which supports the ActiveX controls are able to use the services but the users of other web browsers that do not support them are restricted in using the services.

In addition, as the current authentication procedures are conducted only by confirming the existence of the certificates and the correctness of passwords, the use of the certificates is vulnerable to thefts of the certificates and the passwords.

As such, the certificates currently in use have problems of low level of security, high costs for issuing and limitations in use. Therefore, a lower-cost technique with stronger security and more effective usability which may replace the existing digital certificates is required.

Further, conditions of usability of the certificates currently in use are for limited purposes only, for example, for use with the bank and insurance companies, the securities firms, and for general purposes, not detailed conditions such as for other's permission, limited usage count, weather, date, etc.

Thus, the inventors of the present invention propose a certificate based on a smart contract that overcomes security-related problems, high costs of issuance, limitations in usage, and a lack of usage conditions, in place of the conventional certificates.

In the present specification, the 'smart contract' represents source code which is compiled into byte code capable of an execution on at least one computing device, is configured to perform at least one predetermined procedure if one or more certain conditions are satisfied at the time of the execution, and an integrity about a result of the execution is verified by a consensus outputted from the computing device.

SUMMARY OF THE INVENTION

It is an object of the present invention to solve all the aforementioned problems.

It is another object of the present invention to provide a lower-cost technique with stronger security and more effective usability which may replace existing certificates, and have validity conditions on usage intrinsic to a certificate.

It is still another object of the present invention to provide a certificate service based on a blockchain capable of directly creating a public key and a private key within a user device operated by a user.

It is still yet another object of the present invention to provide a method which may reduce a transaction cost for recording information related to the certificate, which is information corresponding to the certificate and approval/revocation information of the certificate, in a public blockchain and may prevent forgery, by recording the information related to the certificate in a private and the public blockchain of a virtual currency.

It is still yet another object of the present invention to improve service speed and reduce the transaction cost by configuring a Merkle tree by using the information related to the certificate and registering only a root value of the Merkle tree with the blockchain instead of registering all of the information.

It is still yet another object of the present invention to guarantee integrity of a database by performing verification using the Merkle tree.

It is still yet another object of the present invention to guarantee integrity of an execution result, by auditing the validity conditions through the smart contract.

In accordance with one aspect of the present invention, there is provided a method for providing a registration service of a specific certificate based on a specific smart contract, wherein the specific smart contract is at least one source code capable of being compiled into at least one specific byte code executable on at least one computing device, is configured to perform a predetermined procedure if particular conditions are satisfied at a time of execution and wherein integrity about a result of the execution is verified by a consensus outputted from the computing device, including steps of: (a) an intermediate server, if (i) a specific public key PubA corresponding to a user device of a specific user, (ii) an IdhashA which is a hash value of personal information of the specific user, and (iii) a VcertA which includes one or more validity conditions on the specific certificate, are acquired, performing or supporting another device to perform a process of creating the specific smart contract SC(VcertA) corresponding to the validity conditions, and a process of acquiring at least one specific byte code BC(SC(VcertA)) into which the specific smart contract is compiled; (b) the intermediate server, if the specific byte code is acquired, performing or supporting another device to perform a process of registering the specific public key PubA, the IdhashA and the specific byte code BC(SC(VcertA)) as information of the specific certificate with a private blockchain database, and a process of acquiring PrivTxidA as referential information of the specific certificate, which is a locator of the information of the specific certificate in the private blockchain database; (c) the intermediate server, if the PrivTxidA is acquired, performing or supporting another device to perform a process of setting a specific state S(SC(VcertA)) of the specific smart contract SC(VcertA) as an initial state, and a process of registering the PrivTxidA and the specific state S(SC(VcertA)) with an SDB; and (d) the intermediate server, if one or more anchoring conditions for an n-th block of a blockchain in the private blockchain database are satisfied, performing or supporting another device to perform (I) a process of acquiring a specific representative hash value or its processed value calculated by using a specific hash value and its corresponding at least one neighboring hash value to be recorded in the n-th block with the specific hash value, wherein the specific hash value is calculated by using the specific public key PubA, the IdhashA and the specific byte code BC(SC(VcertA)), and wherein the neighboring hash value includes at least one of (i) at least one first associated hash value calculated by using at least one associated public key, at least one Idhash_OTHERS which is a hash value of personal information of at least one of other users and at least one associated byte code into which at least one associated smart contract is compiled, (ii) at least one second associated hash value calculated by using (ii-1) at least one message data which includes approval information or its processed value corresponding to an approval of at least one associated certificate, or revocation requesting information or its processed value corresponding to a revocation of the associated certificate, wherein the associated certificate is referred to by at least one PrivTxid_OTHERS which is at least one locator of at least one associated transaction, (ii-2) at least one signature value of the message data, and (ii-3) the PrivTxid_OTHERS, and (iii) at least one third associated hash value of the SDB or of all variations of the SDB, wherein (iii-1) all the variations of the SDB include all respective changes of all states of all smart contracts, and correspond to differences between states of the SDB at a time of completion of the n-th block and states of the SDB at a time of completion of an (n−1)-th block of the blockchain in the private blockchain database, (iii-2) the states of the SDB are identifiable by all PrivTxids which represent all respective location information on where their corresponding all transactions are recorded in the n-th block, and (iii-3) the SDB includes information on the specific state and at least one associated state of the associated smart contract, and (II) a process of registering the specific representative hash value or its processed value with a public blockchain database.

In accordance with another aspect of the present invention, there is provided a method for providing an approval service of a specific certificate based on a specific smart contract, wherein the specific smart contract is at least one source code capable of being compiled into at least one specific byte code executable on at least one computing device, is configured to perform a predetermined procedure if particular conditions are satisfied at a time of execution and wherein integrity about a result of the execution is verified by a consensus outputted from the computing device, including steps of: (a) an intermediate server, on condition that (i) a specific public key PubA corresponding to a user device of a specific user, (ii) an IdhashA which is a hash value of personal information of the specific user, and (iii) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with an SDB, performing or supporting another device to perform a process of acquiring an approval request of the specific certificate which is a message requesting an approval of the specific certificate based on the specific smart contract SC(VcertA); (b) the intermediate server, if the approval request of the specific certificate is acquired, performing or supporting another device to perform a process of transmitting the PrivTxidA and a TI, which includes information on a subject of an approval, created in response to the approval request, to the user device, and a process of instructing the user device to sign the TI or its processed value with a specific private key PrivA corresponding to the specific public key PubA to thereby generate a signature value SigPrivA(TI or TI'); (c) the intermediate server, if the SigPrivA(TI or TI') is acquired, performing or supporting another device to perform a process of validating the specific certificate by referring to (i) the SigPrivA(TI or TI'), (ii) the TI or its processed value TI', and (iii) the PrivTxidA; (d) the intermediate server, if the specific certificate is determined as valid, performing or supporting another device to perform (i) a process of registering the SigPrivA(TI or TI'), the TI or its processed value TI', and the PrivTxidA, as an approval data of the specific certificate with the private blockchain database, (ii) a process of executing the specific byte code BC(SC(VcertA)) on the computing device, and (iii) a process of updating a specific state S(SC(VcertA)) of the SDB to a new state S'(SC(VcertA)) by referring to a result acquired from the process (ii) of the step (d); and (e) the intermediate server, if one or more anchoring conditions for an n-th block of a blockchain in the private blockchain database are satisfied, performing or supporting another device to perform (I) a process of acquiring a specific representative hash value or its processed value calculated by using a specific hash value, which is a hash value of the approval data, and its corresponding at least one neighboring hash value to be recorded in the n-th block with the specific hash value, wherein the neighboring hash value includes at least one of (i) at least one first associated hash value calculated by using at least one associated public key, at least one Idhash_OTHERS which is a hash value of personal information of at least one of other users and at least one associated byte code into which at least one associated smart contract is compiled, (ii) at least one second associated hash value calculated by using (ii-1) at least one message data which includes approval information or its processed value corresponding to an approval of at least one associated certificate, or revocation requesting information or its processed value corresponding to a revocation of the associated certificate, wherein the associated certificate is referred to by at least one PrivTxid_OTHERS which is at least one locator of at least one associated transaction, (ii-2) at least one signature value of the message data, and (ii-3) the PrivTxid_OTHERS, and (iii) at least one third associated hash value of the SDB or of all variations of the SDB, wherein (iii-1) all the variations of the SDB include all respective changes of all states of all smart contracts, and correspond to differences between states of the SDB at a time of completion of the n-th block and states of the SDB at a time of completion of an (n−1)-th block of the blockchain in the private blockchain database, (iii-2) the states of the SDB are identifiable by all PrivTxids which represent all respective location information on where their corresponding all transactions are recorded in the n-th block, and (iii-3) the SDB includes information on the specific state and at least one associated state of the associated smart contract, and (II) a process of registering the specific representative hash value or its processed value with a public blockchain database.

In accordance with still another aspect of the present invention, there is provided a method for providing a revocation service of a specific certificate based on a specific smart contract, wherein the specific smart contract is at least one source code capable of being compiled into at least one specific byte code executable on at least one computing device, is configured to perform a predetermined procedure if particular conditions are satisfied at a time of execution and wherein integrity about a result of the execution is verified by a consensus outputted from the computing device, including steps of: (a) an intermediate server, on condition that (i) a specific public key PubA corresponding to a user device of a specific user, (ii) an IdhashA which is a hash value of personal information of the specific user, and (iii) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with an SDB, performing or supporting another device to perform a process of acquiring a revocation request of the specific certificate which is a message requesting for a revocation of the specific certificate based on the specific smart contract SC(VcertA); (b) the intermediate server, if the revocation request of the specific certificate is acquired, performing or supporting another device to perform a process of transmitting the PrivTxidA and an RR, which includes information on the revocation request, created in response to the revocation request, to the user device, and a process of instructing the user device to sign the RR or its processed value RR' with a specific private key PrivA corresponding to the specific public key PubA to thereby generate a signature value SigPrivA(RR or RR'); (c), the intermediate server, if the SigPrivA(RR or RR') is acquired, performing or supporting another device to perform a process of validating the specific certificate by referring to (i) the SigPrivA(RR or RR'), (ii) the RR or its processed value RR', and (iii) the PrivTxidA; (d) the intermediate server, if the specific certificate is determined as valid, performing or supporting another device to perform (i) a process of registering the SigPrivA(RR or RR'), the RR or its processed value RR', and the PrivTxidA, as a completion data of the revocation of the specific certificate with the private blockchain database; and (e) the intermediate server, if one or more anchoring conditions for an n-th block of a blockchain in the private blockchain database are satisfied, performing or supporting another device to perform (I) a process of acquiring a specific representative hash value or its processed value calculated by using a specific hash value, which is a hash value of the completion data of the revocation, and its corresponding at least one neighboring hash value to be recorded in the n-th block with the specific hash value, wherein the neighboring hash value includes at least one of (i) at least one first associated hash value calculated by using at least one associated public key, at least one Idhash_OTHERS which is a hash value of personal information of at least one of other users and at least one associated byte code into which at least one associated smart contract is compiled, (ii) at least one second associated hash value calculated by using (ii-1) at least one message data which includes approval information or its processed value corresponding to an approval of at least one associated certificate, or revocation requesting information or its processed value corresponding to a revocation of the associated certificate, wherein the associated certificate is referred to by at least one PrivTxid_OTHERS which is at least one locator of at least one associated transaction, (ii-2) at least one signature value of the message data, and (ii-3) the PrivTxid_OTHERS, and (iii) at least one third associated hash value of the SDB or of all variations of the SDB, wherein (iii-1) all the variations of the SDB include all respective changes of all states of all smart contracts, and correspond to differences between states of the SDB at a time of completion of the n-th block and states of the SDB at a time of completion of an (n−1)-th block of the blockchain in the private blockchain database, (iii-2) the states of the SDB are identifiable by all PrivTxids which represent all respective location information on where their corresponding all transactions are recorded in the n-th block, and (iii-3) the SDB includes information on the specific state and at least one associated state of the associated smart contract, and (II) a process of registering the specific representative hash value or its processed value with a public blockchain database.

In accordance with still yet another aspect of the present invention, there is provided an intermediate server for providing a registration service of a specific certificate based on a specific smart contract, wherein the specific smart contract is at least one source code capable of being compiled into at least one specific byte code executable on at least one computing device, is configured to perform a predetermined procedure if particular conditions are satisfied at a time of execution and wherein integrity about a result of the execution is verified by a consensus outputted from the computing device, including: a communication part for acquiring or supporting another device to acquire (i) a specific public key PubA corresponding to a user device of a specific user, (ii) an IdhashA which is a hash value of personal information of the specific user, and (iii) a VcertA which includes one or more validity conditions on the specific certificate; and a processor for performing or supporting another device to perform (i) a process of creating the specific smart contract SC(VcertA) corresponding to the validity conditions, and a process of acquiring at least one specific byte code BC(SC(VcertA)) into which the specific smart contract is compiled, (ii) a process of, if the specific byte code is acquired, registering the specific public key PubA, the IdhashA and the specific byte code BC(SC(VcertA)) as information of the specific certificate with a private blockchain database, and a process of acquiring PrivTxidA as referential information of the specific certificate, which is a locator of the information of the specific certificate in the private blockchain database, (iii) a process of, if the PrivTxidA is acquired, setting a specific state S(SC(VcertA)) of the specific smart contract SC(VcertA) as an initial state, and a process of registering the PrivTxidA and the specific state S(SC(VcertA)) with an SDB, and (iv) a process of, if one or more anchoring conditions for an n-th block of a blockchain in the private blockchain database are satisfied, acquiring a specific representative hash value or its processed value calculated by using a specific hash value and its corresponding at least one neighboring hash value to be recorded in the n-th block with the specific hash value, wherein the specific hash value is calculated by using the specific public key PubA, the IdhashA and the specific byte code BC(SC(VcertA)), and wherein the neighboring hash value includes at least one of (iv-1) at least one first associated hash value calculated by using at least one associated public key, at least one Idhash_OTHERS which is a hash value of personal information of at least one of other users and at least one associated byte code into which at least one associated smart contract is compiled, (iv-2) at least one second associated hash value calculated by using (iv-2-a) at least one message data which includes approval information or its processed value corresponding to an approval of at least one associated certificate, or revocation requesting information or its processed value corresponding to a revocation of the associated certificate, wherein the associated certificate is referred to by at least one PrivTxid_OTHERS which is at least one locator of at least one associated transaction, (iv-2-b) at least one signature value of the message data, and (iv-2-c) the PrivTxid_OTHERS, and (iv-3) at least one third associated hash value of the SDB or of all variations of the SDB, wherein (iv-3-a) all the variations of the SDB include all respective changes of all states of all smart contracts, and correspond to differences between states of the SDB at a time of completion of the n-th block and states of the SDB at a time of completion of an (n−1)-th block of the blockchain in the private blockchain database, (iv-3-b) the states of the SDB are identifiable by all PrivTxids which represent all respective location information on where their corresponding all transactions are recorded in the n-th block, and (iv-3-c) the SDB includes information on the specific state and at least one associated state of the associated smart contract, and (v) a process of registering the specific representative hash value or its processed value with a public blockchain database.

In accordance with still yet another aspect of the present invention, there is provided an intermediate server for providing an approval service of a specific certificate based on a specific smart contract, wherein the specific smart contract is at least one source code capable of being compiled into at least one specific byte code executable on at least one computing device, is configured to perform a predetermined procedure if particular conditions are satisfied at a time of execution and wherein integrity about a result of the execution is verified by a consensus outputted from the computing device, including: a communication part, on condition that (i) a specific public key PubA corresponding to a user device of a specific user, (ii) an IdhashA which is a hash value of personal information of the specific user, and (iii) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with an SDB, for acquiring or supporting another device to acquire directly or indirectly an approval request of the specific certificate which is a message requesting an approval of the specific certificate based on the specific smart contract SC(VcertA); and a processor for performing or supporting another device to perform (i) a process of transmitting the PrivTxidA and a TI, which includes information on a subject of an approval, created in response to the approval request, to the user device, and a process of instructing the user device to sign the TI or its processed value with a specific private key PrivA corresponding to the specific public key PubA to thereby generate a signature value SigPrivA(TI or TI'), (ii) a process of validating the specific certificate by referring to the SigPrivA(TI or TI'), the TI or its processed value TI', and the PrivTxidA, (iii) if the specific certificate is determined as valid, (iii-1) a process of registering the SigPrivA(TI or TI'), the TI or its processed value TI', and the PrivTxidA, as an approval data of the specific certificate with the private blockchain database, (iii-2) a process of executing the specific byte code BC(SC(VcertA)) on the computing device, and (iii-3) a process of updating a specific state S(SC(VcertA)) of the SDB to a new state S'(SC(VcertA)) by referring to a result acquired from the process (iii-2), and (iv) a process of, if one or more anchoring conditions for an n-th block of a blockchain in the private blockchain database are satisfied, acquiring a specific representative hash value or its processed value calculated by using a specific hash value, which is a hash value of the approval data, and its corresponding at least one neighboring hash value to be recorded in the n-th block with the specific hash value, wherein the neighboring hash value includes at least one of (I) at least one first associated hash value calculated by using at least one associated public key, at least one Idhash_OTHERS which is a hash value of personal information of at least one of other users and at least one associated byte code into which at least one associated smart contract is compiled, (II) at least one second associated hash value calculated by using (II-1) at least one message data which includes approval information or its processed value corresponding to an approval of at least one associated certificate, or revocation requesting information or its processed value corresponding to a revocation of the associated certificate, wherein the associated certificate is referred to by at least one PrivTxid_OTHERS which is at least one locator of at least one associated transaction, (II-2) at least one signature value of the message data, and (II-3) the PrivTxid_OTHERS, and (III) at least one third associated hash value of the SDB or of all variations of the SDB, wherein (III-1) all the variations of the SDB include all respective changes of all states of all smart contracts, and correspond to differences between states of the SDB at a time of completion of the n-th block and states of the SDB at a time of completion of an (n−1)-th block of the blockchain in the private blockchain database, (III-2) the states of the SDB are identifiable by all PrivTxids which represent all respective location information on where their corresponding all transactions are recorded in the n-th block, and (III-3) the SDB includes information on the specific state and at least one associated state of the associated smart contract, and (v) a process of registering the specific representative hash value or its processed value with a public blockchain database.

In accordance with still yet another aspect of the present invention, there is provided an intermediate server for providing a revocation service of a specific certificate based on a specific smart contract, wherein the specific smart contract is at least one source code capable of being compiled into at least one specific byte code executable on at least one computing device, is configured to perform a predetermined procedure if particular conditions are satisfied at a time of execution and wherein integrity about a result of the execution is verified by a consensus outputted from the computing device, including: a communication part, on condition that (i) a specific public key PubA corresponding to a user device of a specific user, (ii) an IdhashA which is a hash value of personal information of the specific user, and (iii) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with an SDB, for acquiring supporting another device to acquire a revocation request of the specific certificate which is a message requesting for a revocation of the specific certificate based on the specific smart contract SC(VcertA); and a processor for performing or supporting another device to perform (i) a process of transmitting the PrivTxidA and an RR, which includes information on the revocation request, created in response to the revocation request, to the user device, and a process of instructing the user device to sign the RR or its processed value RR' with a specific private key PrivA corresponding to the specific public key PubA to thereby generate a signature value SigPrivA(RR or RR'), (ii) a process of validating the specific certificate by referring to the SigPrivA(RR or RR'), the RR or its processed value RR', and the PrivTxidA, (iii) a process of, if the specific certificate is determined as valid, registering the SigPrivA(RR or RR'), the RR or its processed value RR', and the PrivTxidA, as a completion data of the revocation of the specific certificate with the private blockchain database, and (iv) a process of, if one or more anchoring conditions for an n-th block of a blockchain in the private blockchain database are satisfied, acquiring a specific representative hash value or its processed value calculated by using a specific hash value, which is a hash value of the completion data of the revocation, and its corresponding at least one neighboring hash value to be recorded in the n-th block with the specific hash value, wherein the neighboring hash value includes at least one of (iv-1) at least one first associated hash value calculated by using at least one associated public key, at least one Idhash_OTHERS which is a hash value of personal information of at least one of other users and at least one associated byte code into which at least one associated smart contract is compiled, (iv-2) at least one second associated hash value calculated by using (iv-2-a) at least one message data which includes approval information or its processed value corresponding to an approval of at least one associated certificate, or revocation requesting information or its processed value corresponding to a revocation of the associated certificate, wherein the associated certificate is referred to by at least one PrivTxid_OTHERS which is at least one locator of at least one associated transaction, (iv-2-b) at least one signature value of the message data, and (iv-2-c) the PrivTxid_OTHERS, and (iv-3) at least one third associated hash value of the SDB or of all variations of the SDB, wherein (iv-3-a) all the variations of the SDB include all respective changes of all states of all smart contracts, and correspond to differences between states of the SDB at a time of completion of the n-th block and states of the SDB at a time of completion of an (n−1)-th block of the blockchain in the private blockchain database, (iv-3-b) the states of the SDB are identifiable by all PrivTxids which represent all respective location information on where their corresponding all transactions are recorded in the n-th block, and (iv-3-c) the SDB includes information on the specific state and at least one associated state of the associated smart contract, and (v) a process of registering the specific representative hash value or its processed value with a public blockchain database.

BRIEF DESCRIPTION OF THE DRAWINGS

The following drawings to be used to explain example embodiments of the present invention are only part of example embodiments of the present invention and other drawings can be obtained based on the drawings by those skilled in the art of the present invention without inventive work.

FIGS. 5 and 6 are diagrams exemplarily illustrating the smart contract which is a source code with its usage count of the certificate limited to initNumber and ten respectively, in accordance with the present invention.

DETAILED DESCRIPTION OF THE PREFERRED EMBODIMENTS

Figure 1:
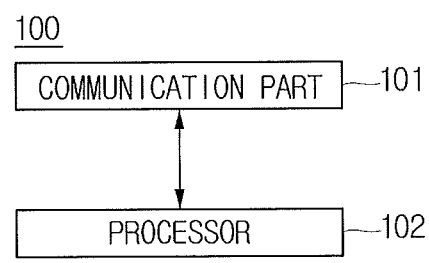
FIG. 1 is a conceptual diagram schematically illustrating an exemplary configuration of an intermediate server providing a certificate service based on a smart contract in accordance with the present invention.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

In this specification, a "public blockchain database" indicates every computing device, on a virtual currency system that resides over a public blockchain which is a blockchain used by public as a blockchain of the virtual currency, functioning as a database.

Further, in this specification, a "private blockchain database" indicates a database using an independently configured private blockchain which is managed directly by an intermediate server of the present invention for the virtual currency, not the public blockchain database.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Unless otherwise indicated in this specification or clearly contradicted in the context, an item indicated in the singular includes those in the plural, unless otherwise required in the context. These embodiments will be described in sufficient detail by referring to attached drawings regarding the embodiments of the present invention to enable those skilled in the art to practice the invention.

FIG. 1 is a conceptual diagram schematically illustrating an exemplary configuration of the intermediate server 100 providing a certificate service based on a smart contract in accordance with the present invention.

By referring to FIG. 1, the intermediate server 100 in accordance with one example embodiment of the present invention may include a communication part 101, a processor 102 and may communicate directly or indirectly with a user device and an approval requesting server.

The intermediate server 100, the user device, and the approval requesting server may achieve desired system performance by using combinations of a computing device, e.g., a computer processor, a memory, a storage, an input device, an output device, and other devices that may include components of conventional computing devices; an electronic communication device such as a router or a switch; an electronic information storage system such as a network-attached storage (NAS) device and a storage area network (SAN), and computer software, i.e., instructions that allow the computing device to function in a specific way.

The communication part 101 of such devices may transmit requests and receive responses with other linked devices. As one example, such requests and responses may be carried out by the same TCP session, but they are not limited to these. For example, they could be transmitted and received as UDP datagrams.

The processor 102 of such devices may include hardware configuration of MPU (Micro Processing Unit) or CPU (Central Processing Unit), cache memory, data bus, etc. Additionally, OS and software configuration of applications that achieve specific purposes may be further included.

A method of providing the certificate service based on the smart contract is described as follows.

Figure 2:
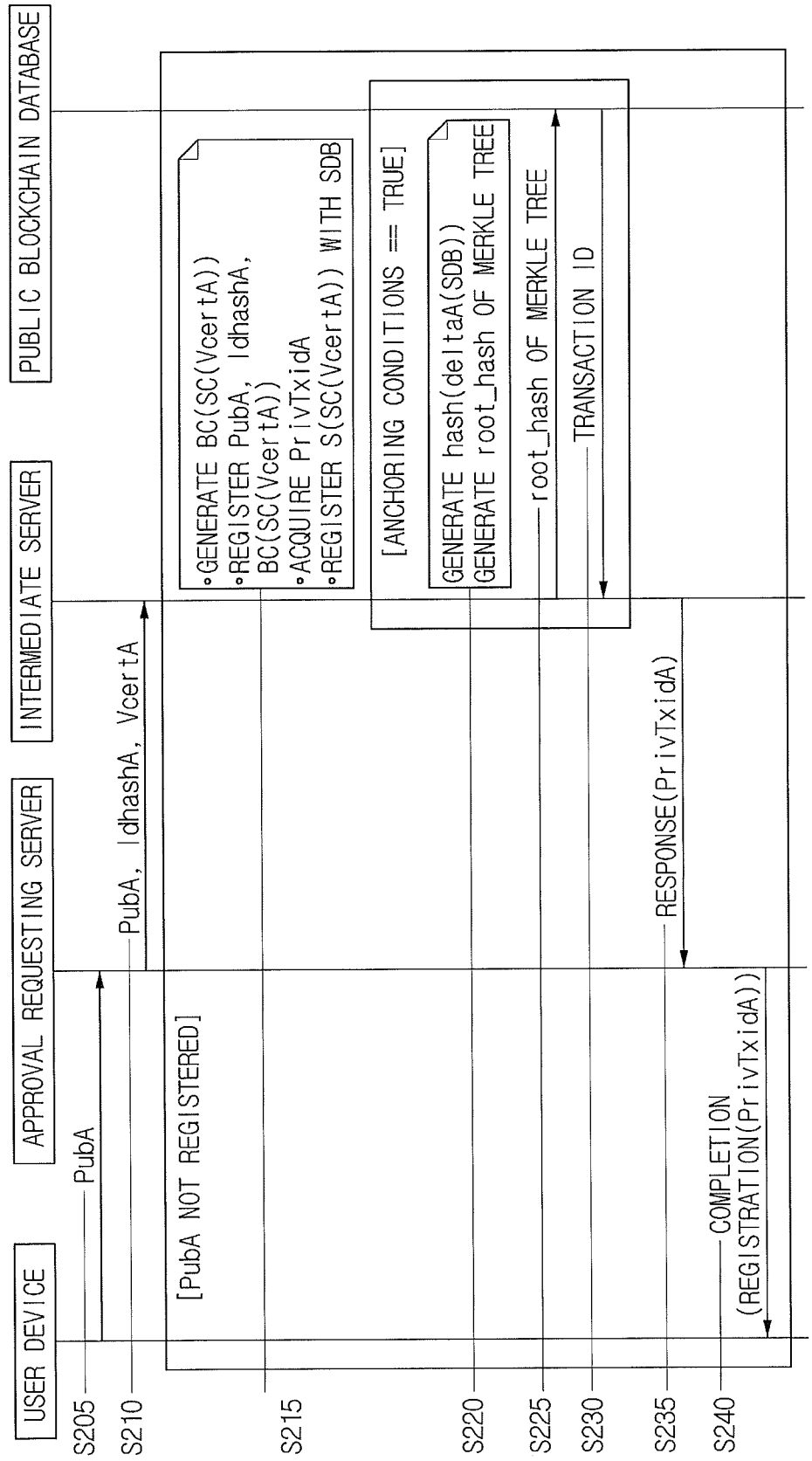
FIG. 2 is a sequence diagram exemplarily illustrating a method of providing a registration service of a certificate based on the smart contract in accordance with the present invention.

FIG. 2 is a sequence diagram exemplarily illustrating a method of providing a registration service of a specific certificate based on the smart contract in accordance with the present invention.

By referring to FIG. 2, if (i) a specific public key PubA corresponding to the user device of a specific user, (ii) an IdhashA which is a hash value of personal information of the specific user, and (iii) a VcertA which includes one or more validity conditions on the specific certificate, are acquired at the steps of S205 to S210, the intermediate server creates a specific smart contract SC(VcertA) corresponding to the validity conditions and acquires at least one specific byte code BC(SC(VcertA)) into which the specific smart contract is compiled, at the step of S215.

Specifically, the IdhashA may be a result of hash calculation of personal information of the specific user. The personal information of the specific user may include at least one of the specific user's name, birth date, contact information, and e-mail address, but not limited to these as known to those skilled in the art.

Hash functions used for the hash calculation may include an MD4 function, an MD5 function, an SHA-0 function, an SHA-1 function, an SHA-224 function, an SHA-256 function, an SHA-384 function, an SHA-512 function, and an HAS-160 function, but not limited to these. For example, a Triple SHA256 function may be further included.

Herein, the validity conditions VcertA of the specific certificate may include any conditions that are based on information acquirable by the specific smart contract, and may include at least part of (i) information on the specific user's characteristics, (ii) weather information at the time of using the specific certificate, (iii) date information at the time of using the specific certificate, (iv) information on at least one person allowed to use the specific certificate, and (v) information on a predetermined count of usage of the specific certificate. Herein the specific user's characteristics may include the specific user's gender, height, and age, etc., and may be included in the smart contract. Further, all the above information from (i) to (v) may be acquired from various sources on the computing device executing the specific smart contract, for example, the weather information at the time of using the specific certificate may be acquired from an Internet web site.

The examples of the smart contract configured according to the VcertA are shown in FIGS. 5 and 6 which illustrate the smart contract, i.e., a source code, with its usage count of the certificate limited to initNumber and ten respectively, in accordance with the present invention.

That is, the disclosed source code includes the validity conditions limiting the usage count. The useCounter is an arbitrary title of the smart contract, int counter; is a command corresponding to a state of a usage counter, and the state of the usage counter modified by a command of counter-=1; is returned by a command of return counter.

Such the smart contract is intended to be converted into a byte code to be run by multiple computing devices, referred to as nodes, which construct the public blockchain database, and each of execution results may be verified by a consensus algorithm which determines an execution result with the most number as the final result. In short, integrity of the execution result of the smart contract may be verified by a consensus on the execution results outputted from the nodes, as known to those skilled in the art. Clearly, the nodes may be a singular node as the case may be, and in this case, a single computing device may output a verification result pursuant to such the consensus.

For reference, an example of the byte code which is a result of the smart contract in FIG. 6 compiled may be 60606040525b600a60006000508190555505b607e80601d6 000396000f360606040526000357c0100000000000000000 00000000000000000000000000000000000000090048063 d732d9551565b9056.

On the other hand, the steps from S205 to S210 may include steps of the intermediate server performing a process of confirming (not illustrated) whether the specific public key PubA and its processed value are registered and a process of transmitting (not illustrated), if the specific public key PubA and its processed value are registered, a message indicating that the specific public key PubA acquired from the user device is already registered. What this means is that the certificate does not need to be newly created if the PubA is already registered, because the PubA is a public key corresponding to the certificate based on the smart contract, therefore the already registered PubA implies that the certificate is already registered.

Next, the method of providing the registration service of the certificate in accordance with the present invention may further include a step of the intermediate server, if the specific byte code is acquired, performing a process of registering the specific public key PubA, the IdhashA and the specific byte code BC(SC(VcertA)), as information of the specific certificate, with the private blockchain database, and a process of acquiring PrivTxidA as referential information of the specific certificate, which is a locator of the information of the specific certificate in the private blockchain database, at the step of S215.

Next, the method of providing the registration service in accordance with the present invention may further include a step of the intermediate server performing a process of setting a specific state S(SC(VcertA)) of the specific smart contract SC(VcertA) as an initial state, and a process of registering the PrivTxidA and the specific state S(SC(VcertA)) with an SDB (i.e., State Database), at the step of S215.

Herein, the initial state may be a state first given to the certificate to determine whether the validity conditions are satisfied, for example, the initial state corresponding to the smart contract in FIG. 6 may be counter=10.

Next, the method of providing the registration service may further include the steps from S220 to S230 of the intermediate server acquiring a specific representative hash value or its processed value, wherein the specific representative hash value is calculated by using (i) a first specific hash value which is a hash value calculated by using (i-1) the specific public key PubA and (i-2) the IdhashA and (i-3) the specific byte code BC(SC(VcertA)), and (ii) its corresponding at least one neighboring hash value which corresponds to the first specific hash value, to thereby register the specific representative hash value or its processed value with the public blockchain database. Herein, the neighboring hash value includes at least one of (i) at least one first associated hash value calculated by using at least one associated public key, at least one Idhash_OTHERS which is a hash value of personal information of at least one of other users and at least one associated byte code into which at least one associated smart contract is compiled, (ii) at least one second associated hash value calculated by using (ii-1) at least one message data which includes approval information or its processed value corresponding to an approval of at least one associated certificate, or revocation requesting information or its processed value corresponding to a revocation of the associated certificate, wherein the associated certificate is referred to by at least one PrivTxid_OTHERS which is at least one locator of at least one associated transaction, (ii-2) at least one signature value of the message data, and (ii-3) the PrivTxid_OTHERS, and (iii) at least one third associated hash value of the SDB or of all variations of the SDB. Herein, (i) all the variations of the SDB include all respective changes of all states of all smart contracts, and correspond to differences between states of the SDB at the time of completion of an n-th block and states of the SDB at the time of completion of an (n−1)-th block of a blockchain in the private blockchain database, (ii) the states of the SDB are identifiable by all PrivTxids which represent all respective location information on where their corresponding all transactions are recorded in the n-th block of the blockchain in the private blockchain database, and (iii) the SDB includes information on the specific state and at least one associated state of the associated smart contract.

For reference, one of the neighboring hash values might as well be a hash value calculated by using information on the states of the SDB or all the variations of the SDB. If the variation is recorded every time a block is created, then later if the block is compromised, the state of the block may be easily recovered by tracking values of the variation.

Meanwhile, the calculation by using the first specific hash value and the at least one neighboring hash value may be performed by various functions. Assume that the first specific hash value is input, and the neighboring hash values are x1, x2, . . . , xn, then the specific representative hash value t may be expressed as a following formula.

$$t=\text{hash}(\text{function}(\text{input},x1,x2,\ldots,xn)) \qquad \text{<Formula 1>}$$

Herein, the intermediate server may store and manage the first specific hash value and the at least one neighboring hash value in a certain data structure. Herein, the data structure may vary and one example may be a Merkle tree. In this case, the calculation by using (i) the first specific hash value and (ii) the at least one hash value which corresponds to the first specific hash value may be performed by utilizing the Merkle tree.

In other words, the intermediate server may perform (i) a process of creating at least one Merkle tree by allotting the first specific hash value to its leaf node, and (ii) a process of registering, if one or more anchoring conditions are satisfied, the specific representative hash value or its processed value calculated by using the first specific hash value and at least one hash value allocated to at least one of other leaf nodes with the public blockchain database. Herein, the anchoring conditions may include at least one of (i) a condition that a certain number of the first specific hash value and the neighboring hash value are acquired or generated, (ii) a condition that a certain amount of time is elapsed, (iii) a condition that the n-th block is created in the private blockchain database, and (iv) a condition that has at least one of characteristics of services.

The intermediate server may register the hash value allocated to the root node as the specific representative hash value with the public blockchain database. Herein, a processed value of the specific representative hash value, for example, a resultant value from hex operation thereof, may be registered.

On the other hand, a first data structure and a second data structure may be connected in a form of a chain if the intermediate server 100 stores the first specific hash value and the at least one neighboring hash value in the first data structure and then stores and manages the second data structure identical in a form to the first data structure.

Especially, as the example aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created.

Further, if the Merkle tree is a first Merkle tree among two or more Merkle trees linked in chains, a hash value or its processed value of a message data, which includes text, numbers or symbols, may be allocated to a first leaf node of the Merkle tree. For example, at the time of creation of the Merkle tree, a hash value of an input message firstly given by the intermediate server may be allocated.

Figure 7:
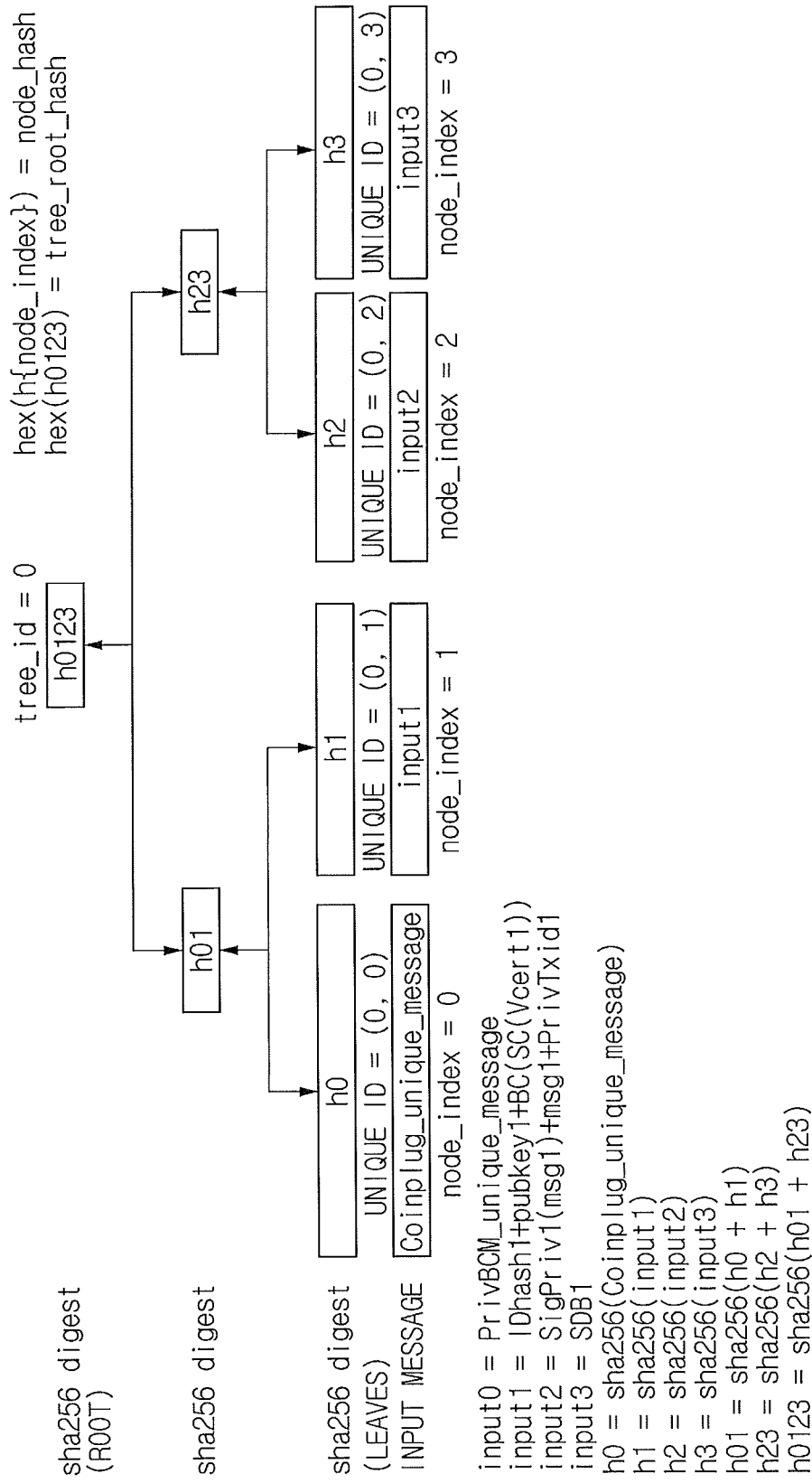
FIGS. 7 and 8 are diagrams illustrating an example of a Merkle tree generated for the certificate service based on the smart contract in accordance with the present invention.
Figure 8:
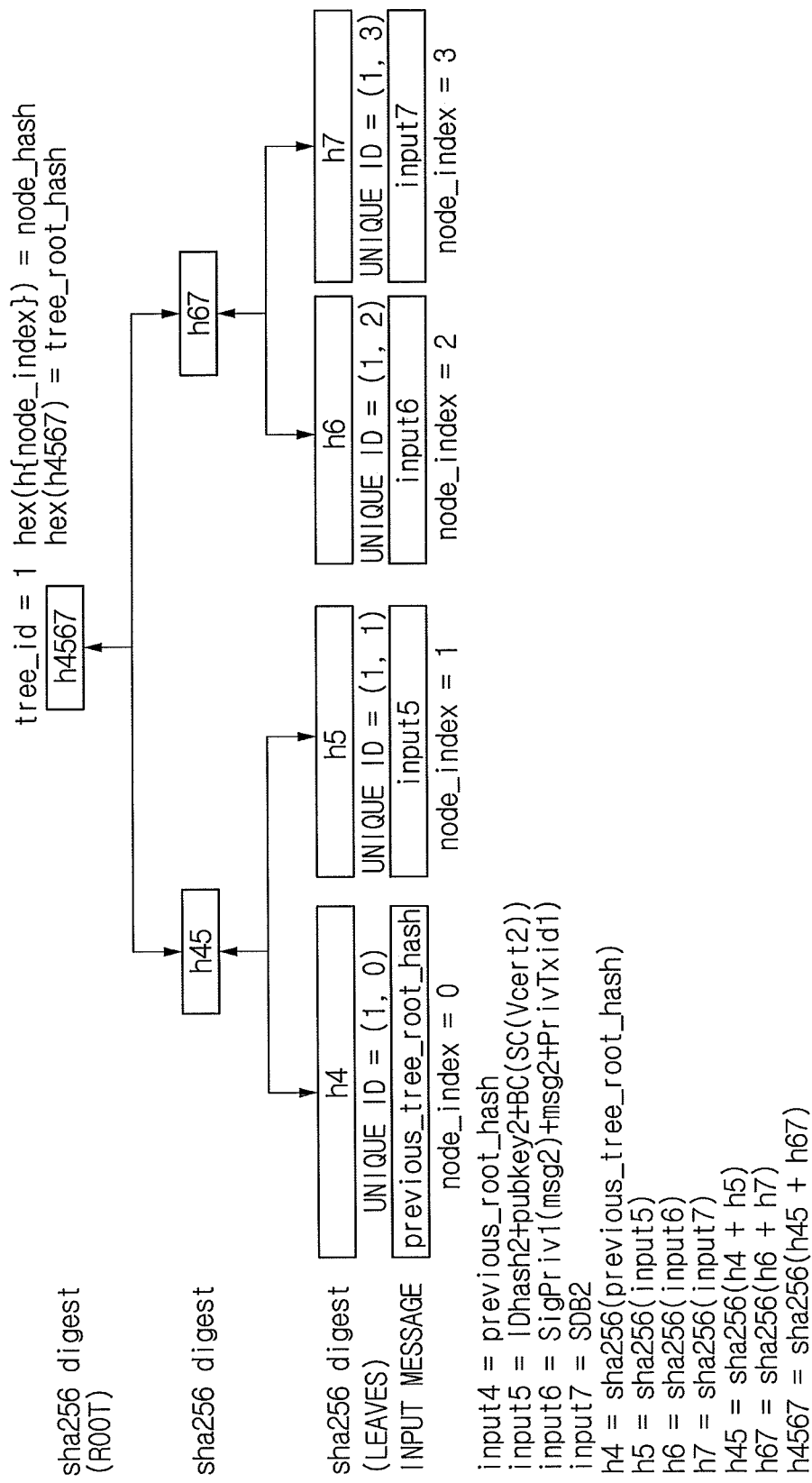

FIGS. 7 and 8 are diagrams illustrating an example of the Merkle tree created in accordance with one example embodiment of the present invention.

FIG. 7 illustrates a Merkle tree with four leaf nodes. As the illustrated Merkle tree is the first Merkle tree whose tree_id is zero, a hash value SHA256(PrivBCM_unique_message) of PrivBCM_unique_message is allocated to an h1 node which is the first leaf node. If the certificate is being registered, the intermediate server may create a leaf node next to a last leaf node of the Merkle tree currently configured and may allocate the first specific hash value or its processed value to the created leaf node. For example, if an allocation of values is completed with the h1 node as a last which is a second leaf node of the Merkle tree in FIG. 7, and if a new leaf node is to be created, then an h2 node which is a next leaf node may be created and the first specific hash value or its processed value (sha256digest(input2)) may be allocated to the h2 node. Further, the intermediate server may calculate by using (i) the first specific hash value and (ii) a hash value allocated to an h3 node which is a sibling node of the h2 node which is a third leaf node to which the first specific hash value is allocated. The hash value of the calculated value may be allocated to an h23 node which is a parent node of the h2 node and the h3 node. Because the parent node, i.e., the h23 node, is not the root node of the Merkle tree, the intermediate server may repeat the process by regarding the hash value allocated to the h23 node as the first specific hash value. In other words, with the hash value allocated to the h23 node as the first specific hash value, the first specific hash value and a hash value in an h01 node may be used together for calculation of a hash value to be allocated to an h0123 node which is a parent node of the h23 node and the h01 node. Herein, because the h0123 node is the root node, the intermediate server may register the processed value (hex(h{node_index})) of the hash value allocated to the h0123 node with the public blockchain database.

To explain this in a recursive way, if the anchoring conditions are satisfied, the intermediate server may perform processes of (x1) calculating an intermediate value by using (i) the first specific hash value and (ii) a hash value allocated to a sibling node of the specific leaf node which includes the first specific hash value, and then allocate a hash value of the intermediate value to a parent node of the specific leaf node, (x2) registering the hash value of the intermediate value with the public blockchain database as the specific representative hash value if the parent node is a root node of the Merkle tree, and (x3) repeating steps from (x1) to (x3) by regarding the hash value of the intermediate value as the first specific hash value and regarding the parent node as the specific leaf node if the parent node is not the root node.

For example, if at least one of hash values of data of registration, approval, or revocation of multiple certificates, that is, at least one of the first associated hash value, the second associated hash value, and the third associated hash value, is acquired whose number equals a certain number of leaf nodes of the aforementioned Merkle tree, then hash values of respective data may be allocated to the leaf nodes.

For example, the intermediate server may create a root value of the Merkle tree aforementioned at stated intervals like the condition (ii). In this case, the intermediate server, if a certain amount of time is elapsed, may create the Merkle tree by referring to input values by the time, and may register the root value of the Merkle tree with the public blockchain database.

However, in this case, a value may not be allocated to a sibling node of the node to which the first specific hash value is allocated even though a certain amount of time is elapsed. In case no hash value is allocated to the sibling node even though the anchoring conditions are met, the intermediate server may allocate a certain hash value to the sibling node to thereby produce a root value of the Merkle tree by the method aforementioned. For example, the intermediate server may copy and allocate the first specific hash value to the sibling node.

The characteristics of services may be at least part of information on a cost paid by the specific user who registered the specific certificate, information on a time-zone during which the registration of the specific certificate is performed, information on a location where the registration of the specific certificate is performed and information on a type of a company that was involved in the registration of the specific certificate. However, they are not limited to these.

Meanwhile, if a creation of a new Merkle tree starts and if the anchoring conditions are satisfied without acquisition of the data of registration, approval, or revocation of the specific certificate, the intermediate server may create the new Merkle tree by allotting certain message data to its first and second leaf nodes and may register the root value of the new Merkle tree or its processed value with the public blockchain database. In this case, the new Merkle tree with two leaf nodes may be created.

FIG. 8 is a diagram illustrating an example of a Merkle tree created in a form of the second data structure in accordance with one example embodiment of the present invention.

By referring to FIG. 8, it is clear that the root value hex(h0123) of the Merkle tree whose tree_id is zero in FIG. 7 is allocated to the first leaf node which is an h4 node of a new Merkle tree. In such a manner, the present invention has advantage of improving the data integrity, as tracking becomes easier even in the case of data forgery, by connecting multiple data structures created when a transaction occurs.

By referring to FIG. 2 again, the method of providing the registration service of the certificate in accordance with the present invention may further include the steps of the intermediate server, if the specific public key PubA, the IdhashA and the specific byte code BC(SC(VcertA)) are registered with the private blockchain database, performing a process of transmitting, at the step of S235, the PrivTxidA and a response indicating a registration, to a certain server, e.g., the registration requesting server in FIG. 2, to thereby instruct the certain server to transmit, at the step of S245, a completion message indicating the registration of the specific certificate to the user device. Herein, the completion message may include the PrivTxidA to allow the specific user to acquire the PrivTxidA.

Next, below is a table describing another example of the Merkle tree generated for the certificate service based on the smart contract in accordance with the present invention.

TABLE 1

| | |
|---|---|
| input0 = PrivBCM_Cert_unique_message | input0 = PrivBCM_Cert_unique_message |
| input1 = IDhash1 + pubkey1 + BC(SC(Vcert1)) | input1 = SigPriv1(msg1) + msg1 + PrivTxid1 |
| input2 = IDhash2 + pubkey2 + BC(SC(Vcert2)) | input2 = SigPriv2(msg2) + msg2 + PrivTxid2 |
| input3 = IDhash3 + pubkey3 + BC(SC(Vcert3)) | input3 = SigPriv3(msg3) + msg3 + PrivTxid3 |
| h0 = sha256(input0) | h0 = sha256(input0) |
| h1 = sha256(input1) | h1 = sha256(input1) |
| h2 = sha256(input2) | h2 = sha256(input2) |
| h3 = sha256(input3) | h3 = sha256(input3) |
| h01 = sha256(h0 + h1) | h01 = sha256(h0 + h1) |
| h23 = sha256(h2 + h3) | h23 = sha256(h2 + h3) |
| h0123 = sha256(h01 + h23) =previous_Cert_root_hash | h0123 = sha256(h01 + h23) =previous_msg_root_hash |
| input4 = previous_Cert_root_hash | input4 = previous_msg_root_hash |
| input5 = IDhash4 + pubkey4 + BC(SC(Vcert4)) | input5 = SigPriv4(msg4) + msg4 + PrivTxid4 |
| input6 = IDhash5 + pubkey5 + BC(SC(Vcert5)) | input6 = SigPriv5(msg5) + msg5 + PrivTxid5 |
| input7 = IDhash6 + pubkey6 + BC(SC(Vcert6)) | input7 = SigPriv6(msg6) + msg6 + PrivTxid6 |
| h4 = sha256(input4) | h4 = sha256(input4) |

TABLE 1-continued

```
h5 = sha256(input5)                    h5 = sha256(input5)
h6 = sha256(input6)                    h6 = sha256(input6)
h7 = sha256(input7)                    h7 = sha256(input7)
h45 = sha256(h4 + h5)                  h45 = sha256(h4 + h5)
h67 = sha256(h6 + h7)                  h67 = sha256(h6 + h7)
h4567 = sha256(h45 + h67)              h4567 = sha256(h45 + h67)
```

In accordance with another example embodiment of the present invention, where same terms refer to the same or similar meanings described in the aforementioned example embodiment, the intermediate server may record an SDB header hash value in a block header of the n-th block when the n-th block is created in the private blockchain database, where the SDB header hash value is a hash value calculated by using information on the states of the SDB or all the variations of the SDB.

In this example embodiment, the data of the registration of the certificate and the data of the approval or the revocation of the certificate may be configured respectively by using different Merkle trees, and more specifically, on condition that (i) a certificate representative hash value is generated from a Merkle tree whose leaf nodes include hash values calculated by using all public keys, all personal information hash values, and all byte codes and (ii) a message representative hash value is generated from a Merkle tree whose leaf nodes include hash values calculated by using (ii-1) all message data which includes all approval information or their processed values corresponding to approvals of all certificates, or all revocation requesting information or their processed values corresponding to revocations of all the certificate, where all the certificates are referred to by all locators of all the transactions, (ii-2) all signature values of all the message data, and (ii-3) all the locators, and (iii) the certificate representative hash value and the message representative hash value are further recorded in the block header of the n-th block, the intermediate server may register the SDB header hash value, the certificate representative hash value and the message representative transaction hash value or their processed values with the public blockchain database. Herein, all the public keys include the specific public key PubA and the associated public key, which are used as elements for calculating hash values recorded in the n-th block, all the personal information hash values include the IdhashA and the Idhash_OTHERS, which are used as elements for calculating hash values recorded in the n-th block, all the byte codes include the specific byte code BC(SC(VcertA)) and the associated byte code, which are used as elements for calculating hash values recorded in the n-th block, and all the locators include the PrivTxidA and the PrivTxid_OTHERS in the n-th block.

In the same example embodiment, the data of the registration of the certificate and the data of the approval or the revocation of the certificate may be configured by using a same Merkle tree, and more specifically, on condition (i) that the private representative hash value is generated from the same Merkle tree whose leaf nodes include hash values calculated by using all the public keys, all the personal information hash values, all the byte codes, all the message data, all the signature values, and all the locators, and (ii) that the private representative hash value is further recorded in the block header of the n-th block, the intermediate server may register the SDB header hash value, the private representative hash value or their processed values with the public blockchain database.

Next, the method of providing an approval service of the certificate by utilizing the data structures aforementioned is described.

Figure 3:
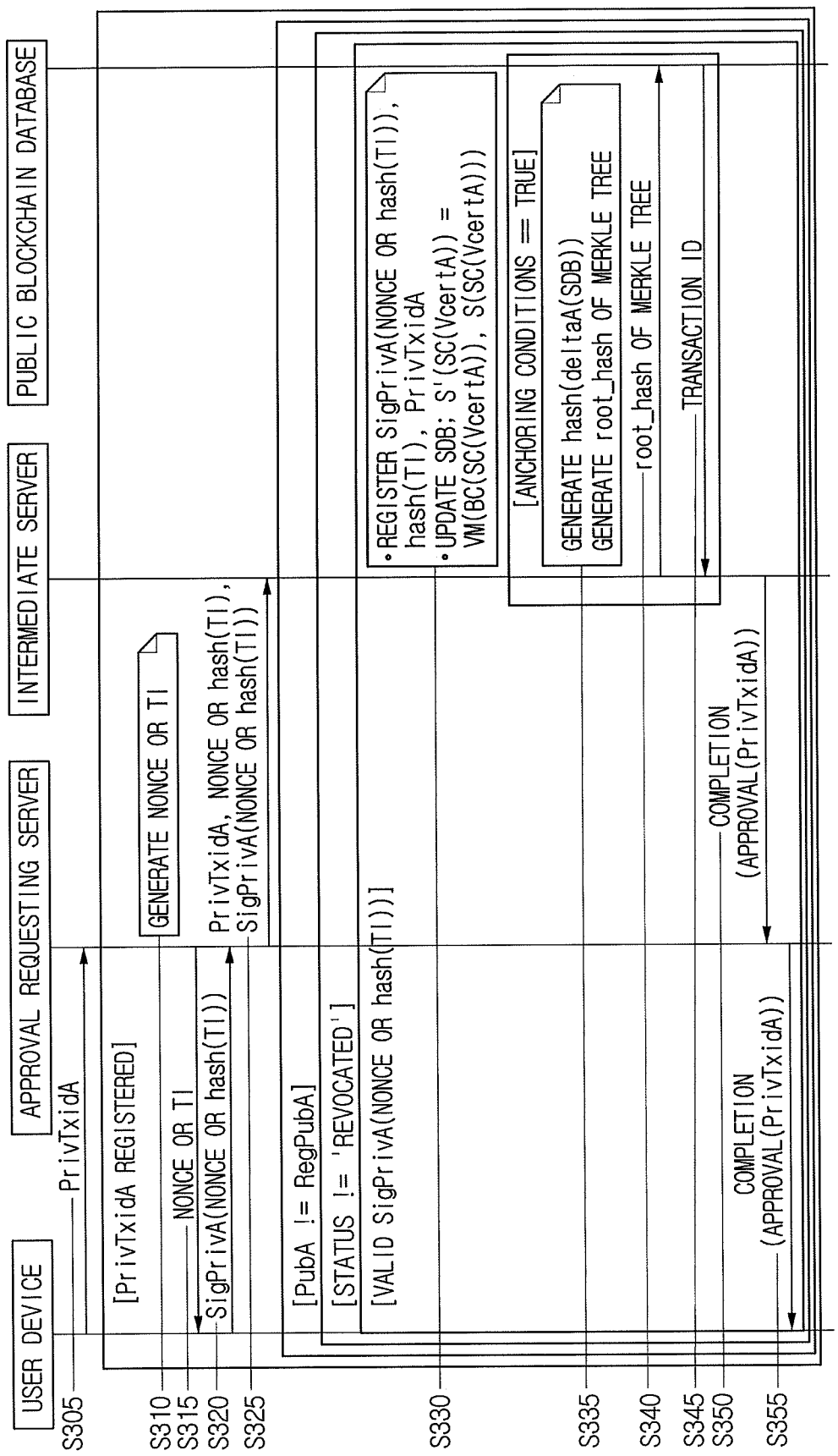
FIG. 3 is a sequence diagram exemplarily illustrating a method of providing an approval service of the certificate based on the smart contract in accordance with the present invention.

FIG. 3 is a sequence diagram exemplarily illustrating a method of providing the approval service of the certificate based on the smart contract in accordance with the present invention.

By referring to FIG. 3, the method of providing the approval service may include the step S305 of the intermediate server, on condition that (i) the specific public key PubA (ii) the IdhashA, and (iii) the specific byte code BC(SC(VcertA)), are recorded at the location indicated by the PrivTxidA with the private blockchain database, and that the PrivTxidA and the specific state S(SC(VcertA)) are registered with the SDB, performing a process of acquiring the approval request of the specific certificate which is a message requesting an approval of the specific certificate based on the specific smart contract SC(VcertA).

In one example embodiment for verifying an integrity of the SDB, the method of providing the approval service may further include steps of the intermediate server performing, on condition that a first representative hash value or its processed value, having been calculated by using a hash value of a former state of the SDB and its corresponding at least one neighboring hash value, is registered with the public blockchain database, and then if the approval request is acquired, (i) a process of determining whether a second representative hash value or its processed value corresponds to the first representative hash value or its processed value, and (ii) a process of determining that the integrity of the SDB is compromised if the second representative hash value or its processed value is determined as not corresponding to the first representative hash value or its processed value. Herein, the second representative hash value is calculated by using a hash value of a current state of the SDB in the private blockchain database and the at least one neighboring hash value corresponding to the former state of the SDB. In detail, the former state of the SDB is a most recent state among a state at the time of the registration of the specific certificate and at the time of the latest approval thereof.

Similar to this, in accordance with another example embodiment of the present invention, to verify an integrity of the certificate registered in the private blockchain database, the method of providing the approval service may include steps of the intermediate server performing, on condition that the first representative hash value or its processed value, having been calculated by using (i) a hash value calculated by using the specific public key PubA, the IdhashA, and the specific byte code BC(SC(VcertA)), and (ii) its corresponding at least one neighboring hash value, is registered with the public blockchain database, and then if the approval request is acquired, (i) a process of determining, at the step of Sb0 not illustrated, whether the second representative hash value or its processed value, which is calculated by using the specific public key PubA, the IdhashA, and the specific byte code BC(SC(VcertA)), corresponds to the first representative hash value or its processed value, and (ii) a process of determining, at the step of Sb1 not illustrated, that the integrity of the specific certificate is compromised if the second representative hash value or its processed value is determined as not corresponding to the first representative hash value or its processed value.

In this example embodiment, the step of (Sb0) may include the step Sb0-1, not illustrated, of the intermediate server performing a process of acquiring the specific public key PubA, the IdhashA, and the specific byte code BC(SC(VcertA)) from the private blockchain database by using the PrivTxidA, and a process of referring to a certain transaction ID related to the PrivTxidA, and the step Sb0-2, not illustrated, of the intermediate server acquiring an OP_RETURN message from the public blockchain database by using the certain transaction ID, and in this case, at the step of (Sb1), if the second representative hash value or its processed value is determined as not corresponding to the first representative hash value or its processed value included in the OP_RETURN message, the intermediate server may perform a process of determining that the integrity of the specific certificate is compromised.

More specifically, at the step of (Sb0-1), to refer to the certain transaction ID related to the PrivTxidA, the intermediate server may perform a process of identifying information on the Merkle tree and its leaf nodes related to the PrivTxidA.

Herein, the second representative hash value may be calculated by using (i) a second specific hash value which is a hash value of the specific public key PubA, the IdhashA, and the specific byte code BC(SC(VcertA)), which are registered with the private blockchain database, and are located by the PrivTxidA within the private blockchain database, and (ii) its matching at least one neighboring hash value, e.g., a hash value allocated to at least one other leaf node which matches the node of the second specific hash value. The description of the aforementioned first specific hash value may also apply to the second specific hash value. In other words, the calculation by using the second specific hash value and at least one neighboring hash value may be performed by various functions. Thus similar part of the explanation thereof is omitted.

In this case, the calculation by using (i) the second specific hash value and (ii) at least one hash value of at least one neighboring node which corresponds to the node of the second specific hash value may be performed by using the Merkle tree. If the message requesting the approval of the specific certificate based on the specific smart contract is acquired, the intermediate server may perform a process of identifying information on the Merkle tree and its leaf nodes related to the PrivTxidA included in the message requesting the approval.

Specifically, the intermediate server may perform processes of (x1) calculating an intermediate value by using (i) the second specific hash value and (ii) a hash value allocated to a sibling node of a specific leaf node where the second specific hash value is allocated, and then allocating a hash value of the intermediate value to a parent node of the specific leaf node, (x2) comparing, if the parent node is a root node of the Merkle tree, the hash value of the intermediate value, as the second representative hash value, with a value included in the OP_RETURN message, and (x3) repeating, if the parent node is not the root node, the steps from (x1) to (x3) by regarding the hash value of the intermediate value as the second specific hash value and regarding the parent node as the specific leaf node.

The above processes are for determining whether the specific certificate is forged, and the next method of providing the approval service of the certificate may further include steps of the intermediate server, if the approval request of the specific certificate is acquired, performing a process of transmitting the PrivTxidA and a TI, which includes information on a subject of the approval, created in response to the approval request, to the user device, and a process of instructing the user device to sign the TI or its processed value TI' with a specific private key PrivA corresponding to the specific public key PubA to thereby generate a signature value SigPrivA(TI or TI').

Herein, the TI may include at least part of (i) the time of requesting the approval and (ii) at least one nonce generated randomly. The nonce may be a random value or its processed value intended to be used once.

Specifically, at the steps of S310 to S320, the intermediate server may perform a process of determining whether the PrivTxidA or its processed value acquired directly or indirectly from the user device is registered, and a process of transmitting a message to the user device indicating that the approval of the specific certificate failed if the PrivTxidA or its processed value is determined as not registered.

Next, the method of providing the approval service of the certificate may further include the step S325 of the intermediate server, if the SigPrivA(TI or TI') is acquired, performing a process of validating the specific certificate by referring to (i) the SigPrivA(TI or TI'), (ii) the TI or its processed value TI', and (iii) the PrivTxidA.

Specifically, the step of S325 may be configured to include steps of the intermediate server performing processes of (i) confirming whether a public key RegPubA corresponding to the user device, and the IdhashA are registered, (ii) transmitting a message indicating that the public key RegPubA is not registered if the RegPubA and the IdhashA are determined as not registered, (iii) transmitting a message indicating that the PubA is not authentic if the RegPubA is not identical to the PubA, (iv) determining that the PubA is valid if the RegPubA is identical to the PubA on condition that the RegPubA and the IdhashA are determined as registered, and (v) determining, at the step of Sc4 (not illustrated), whether the SigPrivA(TI or TI') is legitimately signed if the public key PubA is determined as valid.

Specifically, at the step of Sc4, whether the SigPrivA(TI or TI') is legitimately signed may be determined by referring to the TI or its processed value TI' and the public key PubA.

On the other hand, the step of S325 may include steps of the intermediate server performing a process of determining whether the completion data of the revocation of the specific certificate is registered, and a process of transmitting a message to the user device indicating that the approval of the specific certificate failed if the completion data of the revocation is determined as registered.

After the step of S325, the method of providing the approval service of the certificate may further include the step S330 of the intermediate server, if the specific certificate is determined as valid, performing (i) a process of registering the SigPrivA(TI or TI'), the TI or its processed value TI', and the PrivTxidA, as an approval data of the specific certificate, with the private blockchain database, (ii) a process of executing the specific byte code BC(SC(VcertA)) on the computing device, and (iii) a process of updating the specific state S(SC(VcertA)) of the SDB to a new state S'(SC(VcertA)) by referring to a result acquired from the process (ii).

Specifically, the specific certificate may be determined as valid if all of following conditions are true, which are condition as that (i) the SigPrivA(TI or TI') is determined as legitimately signed, (ii) the PubA is determined as identical to the registered RegPubA, and (iii) the completion data of the revocation of the certificate is determined as not registered yet. If at least one of the above conditions is false, the intermediate server may transmit, at the steps of S360 to S395, a message to the user device indicating that the approval of the specific certificate failed.

Next, the method of providing the approval service of the certificate may further include a step of the intermediate server, if the anchoring conditions for the n-th block of the blockchain in the private blockchain database are satisfied, acquiring the specific representative hash value or its processed value calculated by using (i) the specific hash value which is a hash value of a completion data of the approval of the specific certificate, and (ii) its corresponding at least one neighboring hash value, to thereby register the specific representative hash value or its processed value with the public blockchain database. On the other hand, part of processes of creating the specific representative hash value from the specific hash value and registering with the public blockchain database are similar to the processes aforementioned, and thus omitted.

The method of providing the approval service of the certificate may further include a step of the intermediate server, if the specific certificate is determined as valid, transmitting a completion message to the user device indicating that the approval of the specific certificate is completed. In this case, the completion message may include the PrivTxidA.

Figure 4:
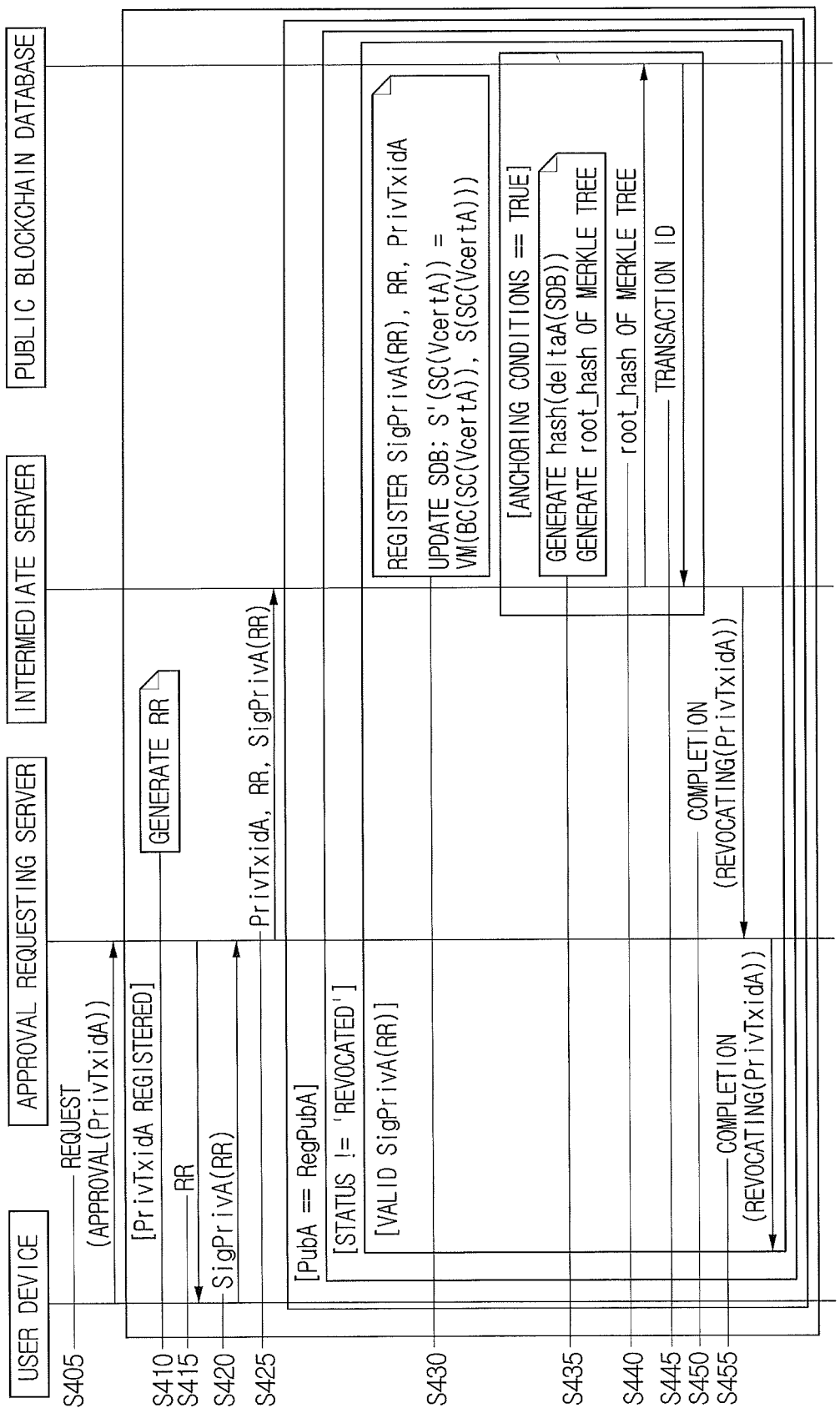
FIG. 4 is a sequence diagram exemplarily illustrating a method of providing a revocation service of the certificate for use and issuance based on the smart contract in accordance with the present invention.

Finally, a method of revoking the registered certificate is described. FIG. 4 is a sequence diagram exemplarily illustrating a method of providing a revocation service of the certificate based on the smart contract in accordance with the present invention.

By referring to FIG. 4, the method of revoking the certificate may include the intermediate server performing, on condition that the specific public key PubA, the IdhashA, and the specific byte code BC(SC(VcertA)) are recorded at the location indicated by the PrivTxidA, and that the PrivTxidA and the specific state S(SC(VcertA)) of the specific smart contract SC(VcertA) are registered with the SDB, (i) a process of acquiring a revocation request of the specific certificate which is a message requesting the revocation of the specific certificate based on the specific smart contract SC(VcertA) at the step of S405; (ii) a process of, if the revocation request of the specific certificate is acquired, the PrivTxidA and an RR, which includes information of the revocation request and is created in response to the revocation request at the step of S410, transmitting to the user device at the step of S415, and instructing the user device to sign the RR or its processed value RR' with the specific private key PrivA corresponding to the specific public key PubA to thereby generate a signature value SigPrivA(RR or RR') of the revocation request at the step of S420; (iii) a process of validating the specific certificate by referring to the SigPrivA(RR or RR'), the RR or its processed value RR', and the PrivTxidA at the step of S425; (iv) a process of registering, if the specific certificate is determined as valid, the SigPrivA(RR or RR'), the RR or its processed value RR', and the PrivTxidA, as the completion data of the revocation of the specific certificate, with the private blockchain database, at the step of S430; and (v) a process of acquiring, if the anchoring conditions are satisfied, the specific representative hash value or its processed value calculated by using the specific hash value, which is a hash value of the completion data of the revocation, and its corresponding at least one neighboring hash value to be recorded in the n-th block with the specific hash value, and a process of registering the specific representative hash value or its processed value with the public blockchain database at the steps of S435 to S445.

Consequently, the process of the revocation may be similar to the process of the approval, but the difference is that, in the process of the approval, the byte code is executed and its result is recorded in the SDB as a state, while in the process of the revocation, the execution of the byte code may not be necessary and the recordation of a state in the SDB also may not be necessary.

However, to complete a procedure that must be performed at the final step of the revocation, the byte code may be executed and a state representing the revocation of the certificate may be recorded in the SDB.

Further, the step of S425 may include a step of the intermediate server performing a process of determining whether the completion data of the revocation of the specific certificate is registered, and a process of transmitting a message to the user device indicating that the revocation of the specific certificate failed if the completion data of the revocation is determined as registered.

Further, in accordance with another example embodiment, at the steps of S410 to S420, the intermediate server may perform a process of determining whether the PrivTxidA or its processed value acquired directly or indirectly from the user device is registered, and a process of transmitting a message to the user device indicating that the revocation of the specific certificate failed if the PrivTxidA or its processed value is determined as not registered.

The advantages of the technique described herein with the above embodiments are guarantees of reliability of the certificates by preventing forgery of information related to the approval, such as public keys, hash values, etc., and reliability of their use by preventing forgery of the validity conditions. The technique further makes it possible to improve service speed and reduce the transaction cost by configuring a Merkle tree by using information related to the certificates, which is information corresponding to the certificates and the approval and revocation information of the certificates, and by registering only a root value of the Merkle tree with the blockchain instead of registering all of the information.

The present invention has an effect of providing a lower-cost technique with stronger security, more effective usability which may replace the existing certificate, and the validity conditions on usage intrinsic to the certificate, in all of the embodiments aforementioned of the present invention.

The present invention has another effect of providing the certificate service, which includes the validity conditions on its usage, by using the lower-cost technique with stronger security and more effective usability which may replace the existing certificate.

The present invention has still another effect of providing high level of security by using strong cryptography.

The present invention has still yet another effect of guaranteeing reliability by preventing forgery of information related to the certificates.

Based on the explanation of the above embodiment, those skilled in the art can clearly understand that the present invention can be implemented by combination of software and hardware or hardware alone. The part contributing to the prior art or the object of a technical solution of the present invention may be implemented in a form of executable program command through a variety of computer components and recorded to computer readable media. The computer readable media may include solely or in combination, program commands, data files, and data structures. The program commands recorded to the media may be components specially designed for the present invention or may be known, and usable to a skilled human in a general field. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present invention and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing a registration service of a specific certificate based on a specific smart contract, wherein the specific smart contract is at least one source code capable of being compiled into at least one specific byte code executable on at least one computing device, is configured to perform a predetermined procedure when particular conditions are satisfied at a time of execution and wherein integrity about a result of the execution is verified by a consensus outputted from the computing device, comprising steps of:
    (a) an intermediate server, when
        (i) a specific public key PubA corresponding to a user device of a specific user,
        (ii) an IdhashA which is a hash value of personal information of the specific user, and
        (iii) a VcertA which includes one or more validity conditions on the specific certificate, are acquired, performing or supporting another device to perform a process of creating the specific smart contract SC(VcertA) corresponding to the validity conditions, and a process of acquiring at least one specific Byte Code BC(SC(VcertA)) into which the specific smart contract is compiled;
    (b) the intermediate server, when the specific byte code is acquired, performing or supporting another device to perform a process of registering the specific public key PubA, the IdhashA and the specific byte code BC(SC(VcertA)) as information of the specific certificate with a private blockchain database, and a process of acquiring PrivTxidA as referential information of the specific certificate, which is a locator of the information of the specific certificate in the private blockchain database;
    (c) the intermediate server, when the PrivTxidA is acquired, performing or supporting another device to perform a process of setting a specific state S(SC(VcertA)) of the specific smart contract SC(VcertA) as an initial state, and a process of registering the PrivTxidA and the specific state S(SC(VcertA)) with State Database (SDB); and
    (d) the intermediate server, when one or more anchoring conditions for an n-th block of a blockchain in the private blockchain database are satisfied,
    performing or supporting another device to perform
    (I) a process of acquiring a specific representative hash value or its processed value calculated by using a specific hash value and its corresponding at least one neighboring hash value to be recorded in the n-th block with the specific hash value,
    wherein the specific hash value is calculated by using the specific public key PubA, the IdhashA and the specific byte code BC(SC(VcertA)), and
    wherein the neighboring hash value includes
        (i) at least one first associated hash value calculated by using at least one associated public key, at least one Idhash_OTHERS which is a hash value of personal information of at least one of other users and at least one associated byte code into which at least one associated smart contract is compiled,
        (ii) at least one second associated hash value of the SDB or of all variations of the SDB, wherein
            (ii-1) all the variations of the SDB include all respective changes of all states of smart contracts, and correspond to a difference between states of the SDB at a time of completion of the n-th block and states of the SDB at a time of completion of an (n−1)-th block of the blockchain in the private blockchain database,
            (ii-2) the states of the SDB are identifiable by PrivTxids which represent respective location information of transactions and on where their corresponding transactions are recorded in the n-th block, and
            (ii-3) the SDB includes information on the specific state and at least one associated state of the associated smart contract, and
    (II) a process of registering the specific representative hash value or its processed value with a public blockchain database.

2. The method of claim 1, further comprising a step of: (e) the intermediate server, when the specific public key PubA, the IdhashA and the specific byte code BC(SC(VcertA)) are registered with the private blockchain database, performing or supporting another device to perform a process of transmitting the PrivTxidA and a response indicating a registration to a certain server to thereby instruct the certain server to transmit a completion message indicating the registration of the specific certificate to the user device, wherein the completion message includes the PrivTxidA.

3. The method of claim 1, wherein, at the step of (a), the intermediate server performs or supports another device to perform (a1) a process of confirming whether the specific public key PubA and its processed value are registered; and (a2) a process of transmitting, when the specific public key PubA and its processed value are registered, a message indicating that the specific public key PubA acquired from the user device is already registered.

4. The method of claim 1, wherein, the IdhashA is a hash value of the personal information including at least one of the specific user's name, birth date, contact information, and e-mail address.

5. The method of claim 1, wherein, the validity conditions VcertA of the specific certificate are based on at least part of (i) information on the specific user's characteristics, (ii) weather information at a time of using the specific certificate, (iii) date information at the time of using the specific certificate, (iv) information on at least one person allowed to use the specific certificate, and (v) information on a predetermined count of usage of the specific certificate.

6. The method of claim 1, wherein, at the step of (d), the anchoring conditions include at least one of (i) a condition that a certain number of the specific hash value and the neighboring hash value are acquired or generated, (ii) a condition that a certain amount of time is elapsed, (iii) a condition that the n-th block is created in the private blockchain database, and (iv) a condition that has at least one of characteristics of services.

7. The method of claim 6, wherein the intermediate server records or supports another device to record an SDB header hash value in a block header of the n-th block when the n-th block is created in the private blockchain database, and wherein the SDB header hash value is a hash value calculated by using information on the states of the SDB or all the variations of the SDB.

8. The method of claim 7, wherein, at the step of (d), on condition that
   (i) a certificate representative hash value is generated from a Merkle tree whose leaf nodes include hash values calculated by using public keys, personal information hash values, and byte codes, and
   (ii) a message representative hash value is generated from a Merkle tree whose leaf nodes include hash values calculated by using
   (ii-1) message data which include approval information or their processed values corresponding to approvals of certificates, or revocation requesting information or their processed values corresponding to revocations of the certificates, the certificates being referred to by locators of transactions
   (ii-2) signature values of the message data, and
   (ii-3) the locators, and
   (iii) the certificate representative hash value and the message representative hash value are further recorded in the block header of the n-th block,
   the intermediate server registers or supports another device to register the SDB header hash value, the certificate representative hash value and the message representative transaction hash value or their processed values with the public blockchain database,
   wherein the public keys include the specific public key PubA and the associated public key, which are used as elements for calculating hash values recorded in the n-th block,
   wherein the personal information hash values include the IdhashA and the Idhash_OTHERS, which are used as elements for calculating hash values recorded in the n-th block,
   wherein the byte codes include the specific byte code BC(SC(VcertA)) and the associated byte code, which are used as elements for calculating hash values recorded in the n-th block, and wherein the locators include the PrivTxidA and the PrivTxids in the n-th block.

9. The method of claim 7, wherein, at the step of (d), on condition that a private representative hash value is generated from a Merkle tree whose leaf nodes include
   (i) hash values calculated by using public keys, personal information hash values, and byte codes, and
   (ii) hash values calculated by using
   (ii-1) message data which include approval information or their processed values corresponding to approvals of certificates, or revocation requesting information or their processed values corresponding to revocations of the certificates, certificates being referred to by locators of transactions
   (ii-2) signature values of the message data, and
   (ii-3) the locators, and
   (iii) the private representative hash value is further recorded in the block header of the n-th block, the intermediate server registers or supports another device to register the SDB header hash value, the private representative hash value or their processed values with the public blockchain database,
   wherein the public keys include the specific public key PubA and the associated public key, which are used as elements for calculating hash values recorded in the n-th block, wherein the personal information hash values include the IdhashA and the Idhash_OTHERS, which are used as elements for calculating hash values recorded in the n-th block, wherein the byte codes include the specific byte code BC(SC(VcertA)) and the associated byte code, which are used as elements for calculating hash values recorded in the n-th block, and wherein the locators include the PrivTxidA and the PrivTxids in the n-th block.

10. The method of claim 1, wherein, at the step of (d), the intermediate server performs or supports another device to perform (i) a process of creating at least one Merkle tree by allotting the specific hash value to its a leaf node, and (ii) a process of registering, when the anchoring conditions are satisfied, the specific representative hash value or its processed value calculated by using the specific hash value of a specific leaf node and at least one hash value allocated to at least one of other leaf nodes corresponding to the specific leaf node with the public blockchain database.

11. The method of claim 10, wherein, when the Merkle tree is a first tree among two or more Merkle trees linked in chains, a hash value or its processed value of a message data, which includes text, numbers or symbols, is allocated to a first leaf node of the Merkle tree.

12. The method of claim 10, wherein, when the anchoring conditions are satisfied, (x1) the intermediate server calculates or supports another device to calculate an intermediate value by using (i) the specific hash value and (ii) a hash value allocated to a sibling node of the specific leaf node, and then allocates or supports another device to allocate a hash value of the intermediate value to a parent node of the specific leaf node, (x2) the intermediate server, when the parent node is a root node of the Merkle tree, registers or supports another device to register the hash value of the intermediate value with the public blockchain database as the specific representative hash value, and (x3) the intermediate server, when the parent node is not the root node, repeats or supports another device to repeat steps from (x1) to (x3) by regarding the hash value of the intermediate value as the specific hash value and regarding the parent node as the specific leaf node.

13. The method of claim 12, wherein, when no hash value is allocated to the sibling node of the specific leaf node even though the anchoring conditions are satisfied, the intermediate server allocates or supports another device to allocate a certain hash value to the sibling node then performs or supports another device to perform the steps of (x1) to (x3).

14. The method of claim 1, wherein, when the intermediate server stores the specific hash value and the at least one neighboring hash value in a first data structure and then stores and manages a second data structure identical in a form to the first data structure, the first data structure and the second data structure are connected in a form of a chain.

15. The method of claim 14, wherein, when the first data structure and the second data structure are Merkle trees, a root value of the first data structure or a hash value of the root value is allocated to a first leaf node of the second data structure.

16. The method of claim 1, wherein, when no information is acquired from the user device during the step of (a), (b), and (c), and then, at the step of (d), when the anchoring conditions are satisfied, the intermediate server performs or supports another device to perform a process of creating a Merkle tree by allotting a message data to first and second nodes, and a process of registering a root value of the Merkle tree or its processed value with the public blockchain database.

17. A method for providing an approval service of a specific certificate based on a specific smart contract,
wherein the specific smart contract is at least one source code capable of being compiled into at least one specific byte code executable on at least one computing device, is configured to perform a predetermined procedure when particular conditions are satisfied at a time of execution and wherein integrity about a result of the execution is verified by a consensus outputted from the computing device, comprising steps of:
(a) an intermediate server, on condition that
 (i) a specific public key PubA corresponding to a user device of a specific user,
 (ii) an IdhashA which is a hash value of personal information of the specific user, and
 (iii) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with a State Database (SDB), performing or supporting another device to perform a process of acquiring an approval request of the specific certificate which is a message requesting an approval of the specific certificate based on the specific smart contract SC(VcertA);
(b) the intermediate server, when the approval request of the specific certificate is acquired, performing or supporting another device to perform a process of transmitting the PrivTxidA and a Transaction ID (TI), which includes information on a subject of an approval, created in response to the approval request, to the user device, and a process of instructing the user device to sign the TI or its processed value TI' with a specific private key PrivA corresponding to the specific public key PubA to thereby generate a signature value SigPrivA(TI or TI');
(c) the intermediate server, when the SigPrivA(TI or TI') is acquired, performing or supporting another device to perform a process of validating the specific certificate by referring to
 (i) the SigPrivA(TI or TI'),
 (ii) the TI or its processed value TI', and
 (iii) the PrivTxidA;
(d) the intermediate server, when the specific certificate is determined as valid, performing or supporting another device to perform
 (i) a process of registering the SigPrivA(TI or TI'), the TI or its processed value TI', and the PrivTxidA, as an approval data of the specific certificate with the private blockchain database,
 (ii) a process of executing the specific byte code BC(SC(VcertA)) on the computing device, and
 (iii) a process of updating a specific state S(SC(VcertA)) of the SDB to a new state S'(SC(VcertA)) by referring to a result acquired from the process (ii) of the step (d); and
(e) the intermediate server, when one or more anchoring conditions for an n-th block of a blockchain in the private blockchain database are satisfied, performing or supporting another device to perform
(I) a process of acquiring a specific representative hash value or its processed value calculated by using a specific hash value, which is a hash value of the approval data, and its corresponding at least one neighboring hash value to be recorded in the n-th block with the specific hash value, wherein the neighboring hash value includes
 (i) at least one first associated hash value calculated by using at least one associated public key, at least one Idhash_OTHERS which is a hash value of personal information of at least one of other users and at least one associated byte code into which at least one associated smart contract is compiled,
 (ii) at least one second associated hash value of the SDB or of all variations of the SDB, wherein
  (ii-1) all the variations of the SDB include all respective changes of all states of smart contracts, and correspond to a difference between states of the SDB at a time of completion of the n-th block and states of the SDB at a time of completion of an (n−1)-th block of the blockchain in the private blockchain database,
  (ii-2) the states of the SDB are identifiable by PrivTxids which represent respective location information of transactions and on where their corresponding transactions are recorded in the n-th block, and
  (ii-3) the SDB includes information on the specific state and at least one associated state of the associated smart contract, and
(II) a process of registering the specific representative hash value or its processed value with a public blockchain database.

18. The method of claim 17, before the step of (b), further comprising steps of: (b0') the intermediate server, on condition that a first representative hash value, having been calculated by using a hash value of a former state of the SDB and its corresponding at least one neighboring hash value, is registered with the public blockchain database, and then when the approval request is acquired, performing or supporting another device to perform a process of determining whether a second representative hash value or its processed value corresponds to the first representative hash value or its processed value, wherein the second representative hash value is calculated by using a hash value of a current state of the SDB in the private blockchain database and the at least one neighboring hash value corresponding to the former state of the SDB, and wherein the former state of the SDB is a most recent state among a state at a time of registration of the specific certificate and at a time of latest approval thereof; and (b1') the intermediate server, when the second representative hash value or its processed value is determined as not corresponding to the first representative hash value or its processed value, performing or supporting another device to perform determining that an integrity of the SDB is compromised.

19. The method of claim 17, before the step of (b), further comprising steps of: (b0) the intermediate server, on condition that a first representative hash value or its processed value, having been calculated by using (i) a hash value calculated by using the specific public key PubA, the IdhashA, and the specific byte code, and (ii) its corresponding at least one neighboring hash value, is registered with the public blockchain database, and then when the approval request is acquired, performing or supporting another device to perform a process of determining whether a second representative hash value or its processed value, which is calculated by using the specific public key PubA, the IdhashA, and the specific byte code, corresponds to the first representative hash value or its processed value; and (b1) the intermediate server, when the second representative hash value or its processed value is determined as not corresponding to the first representative hash value or its processed value, performing or supporting another device to perform determining that an integrity of the specific certificate is compromised.

20. The method of claim 19, wherein, at the step of (b0), (b0-1) the intermediate server performs or supports another device to perform a process of acquiring the specific public key PubA, the IdhashA, and the specific byte code from the private blockchain database by using the PrivTxidA, and a process of referring to a certain transaction ID related to the PrivTxidA; and (b0-2) the intermediate server acquires or supports another device to acquire an OP_RETURN message from the public blockchain database by using the certain transaction ID, and at the step of (b1), the intermediate server, when the second representative hash value or its processed value is determined as not corresponding to the first representative hash value or its processed value included in the OP_RETURN message, performing or supporting another device to perform determining that the integrity of the specific certificate is compromised.

21. The method of claim 20, wherein, at the step of (b0-1), the intermediate server performs or supports another device to perform a process of identifying information on a Merkle tree and its leaf nodes related to the PrivTxidA and a process of referring to the certain transaction ID corresponding to the information on the Merkle tree.

22. The method of claim 19, wherein the second representative hash value is calculated by using (i) a second specific hash value which is a hash value of the specific public key PubA, the IdhashA, and the specific byte code, which are registered with the private blockchain database, and are located by the PrivTxidA within the private blockchain database, and (ii) its matching at least one neighboring hash value.

23. The method of claim 21, wherein, the second representative hash value is calculated by using a second specific hash value and a hash value allocated to at least one other leaf node which matches a node of the second specific hash value in a Merkle tree.

24. The method of claim 23, wherein,
(x1) the intermediate server calculates or supports another device to calculate an intermediate value by using (i) the second specific hash value and (ii) a hash value allocated to a sibling node of a specific leaf node where the second specific hash value is allocated, and then allocates or supports another device to allocate a hash value of the intermediate value to a parent node of the specific leaf node,
(x2) the intermediate server, when the parent node is a root node of the Merkle tree, compares or supports another device to compare the hash value of the intermediate value, as the second representative hash value, with a value included in the OP_RETURN message, and
(x3) the intermediate server, when the parent node is not the root node, repeats or supports another device to repeat the steps from (x1) to (x3) by regarding the hash value of the intermediate value as the second specific hash value and regarding the parent node as the specific leaf node.

25. The method of claim 17, wherein, at the step of (c),
(c1) the intermediate server confirms or supports another device to confirm whether a public key RegPubA corresponding to the user device, and the IdhashA are registered;
(c2) the intermediate server, when the RegPubA and the IdhashA are determined as not registered, transmits or supports another device to transmit a message indicating that the public key RegPubA is not registered;
(c3) the intermediate server, on condition that the RegPubA and the IdhashA are determined as registered, performs or supports another device to perform a process of transmitting a message indicating that the PubA is not authentic when the RegPubA is not identical to the PubA, and a process of determining that the PubA is valid when the RegPubA is identical to the PubA; and
(c4) the intermediate server, when the public key PubA is determined as valid, determines or supports another device to determine whether the SigPrivA(TI or TI') is legitimately signed.

26. The method of claim 25, wherein, at the step of (c4), whether the SigPrivA(TI or TI') is legitimately signed is determined by referring to the TI or its processed value TI' and the public key PubA.

27. The method of claim 17, wherein, at the step of (c), the intermediate server performing or supporting another device to perform a process of determining whether a completion data of revocation of the specific certificate is registered, and a process of transmitting a message indicating that an approval of the specific certificate failed to the user device when the completion data of revocation is determined as registered.

28. The method of claim 17, further comprising a step of:
(f) the intermediate server, when the specific certificate is determined as valid, transmits or supports another device to transmit a message indicating that an approval of the specific certificate is completed to the user device.

29. The method of claim 17, wherein, the TI includes at least part of (i) a time of requesting the approval and (ii) at least one nonce generated randomly.

30. The method of claim 17, wherein, at the step of (b), the intermediate server performs or supports another device to perform a process of determining whether the PrivTxidA or its processed value acquired directly or indirectly from the user device is registered, and a process of transmitting a message indicating that an approval of the specific certificate failed to the user device when the PrivTxidA or its processed value is determined as not registered.

31. A method for providing a revocation service of a specific certificate based on a specific smart contract, wherein the specific smart contract is at least one source code capable of being compiled into at least one specific byte code executable on at least one computing device, is configured to perform a predetermined procedure when particular conditions are satisfied at a time of execution and wherein integrity about a result of the execution is verified by a consensus outputted from the computing device, comprising steps of:
(a) an intermediate server, on condition that
(i) a specific public key PubA corresponding to a user device of a specific user,
(ii) an IdhashA which is a hash value of personal information of the specific user, and
(iii) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with a State Database (SDB), performing or supporting another device to perform a process of acquiring a revocation request of the specific certificate which is a message requesting for a revocation of the specific certificate based on the specific smart contract SC(VcertA);
(b) the intermediate server, when the revocation request of the specific certificate is acquired, performing or supporting another device to perform a process of transmitting the PrivTxidA and a Revocation Request (RR), which includes information on the revocation request, created in response to the revocation request, to the user device, and a process of instructing the user device to sign the RR or its processed value RR' with a specific private key PrivA corresponding to the specific public key PubA to thereby generate a signature value SigPrivA(RR or RR');
(c) the intermediate server, when the SigPrivA(RR or RR') is acquired, performing or supporting another device to perform a process of validating the specific certificate by referring to
(i) the SigPrivA(RR or RR'),
(ii) the RR or its processed value RR', and
(iii) the PrivTxidA;
(d) the intermediate server, when the specific certificate is determined as valid, performing or supporting another device to perform
(i) a process of registering the SigPrivA(RR or RR'), the RR or its processed value RR', and the PrivTxidA, as a completion data of the revocation of the specific certificate with the private blockchain database; and
(e) the intermediate server, when one or more anchoring conditions for an n-th block of a blockchain in the private blockchain database are satisfied, performing or supporting another device to perform
(I) a process of acquiring a specific representative hash value or its processed value calculated by using a specific hash value, which is a hash value of the completion data of the revocation, and its corresponding at least one neighboring hash value to be recorded in the n-th block with the specific hash value, wherein the neighboring hash value includes
(i) at least one first associated hash value calculated by using at least one associated public key, at least one Idhash_OTHERS which is a hash value of personal information of at least one of other users and at least one associated byte code into which at least one associated smart contract is compiled,
(ii) at least one second associated hash value of the SDB or of all variations of the SDB, wherein
(ii-1) all the variations of the SDB include all respective changes of all states of smart contracts, and correspond to a difference between states of the SDB at a time of completion of the n-th block and states of the SDB at a time of completion of an (n−1)-th block of the blockchain in the private blockchain database,
(ii-2) the states of the SDB are identifiable by PrivTxids which represent respective location information of transactions and on where their corresponding transactions are recorded in the n-th block, and
(ii-3) the SDB includes information on the specific state and at least one associated state of the associated smart contract, and
(II) a process of registering the specific representative hash value or its processed value with a public blockchain database.

32. The method of claim 31, wherein, at the step of (c), the intermediate server performing or supporting another device to perform a process of determining whether the completion data of the revocation of the specific certificate is registered, and a process of transmitting a message to the user device indicating that the revocation of the specific certificate failed when the completion data of the revocation is determined as registered.

33. The method of claim 31, wherein, at the step of (b), the intermediate server performs or supports another device to perform a process of determining whether the PrivTxidA or its processed value acquired directly or indirectly from the user device is registered, and a process of transmitting a message to the user device indicating that the revocation of the specific certificate failed when the PrivTxidA or its processed value is determined as not registered.

34. An intermediate server for providing a registration service of a specific certificate based on a specific smart contract, wherein the specific smart contract is at least one source code capable of being compiled into at least one specific byte code executable on at least one computer device, is configured to perform a predetermined procedure if particular conditions are satisfied at a time of execution and wherein integrity about a result of the execution is verified by a consensus outputted from the computer device, comprising:
a processor for performing or supporting another computer device to perform
(i) a process of creating the specific smart contract SC(VcertA) corresponding to the validity conditions, wherein the VcertA includes one or more validity conditions on the specific certificate, and a process of acquiring at least one specific byte code BC(SC(VcertA)) into which the specific smart contract is compiled, (ii) a process of, if the specific byte code is acquired, registering a specific public key PubA corresponding to a user computer device of a specific user, an IdhashA, which is a hash value of personal information of the specific user, and the specific byte code BC(SC(VcertA)) as information of the specific certificate with a private blockchain database, and a process of acquiring PrivTxidA as referential information of the specific certificate, which is a locator of the information of the specific certificate in the private blockchain database, (iii) a process of, if the PrivTxidA is acquired, setting a specific state S(SC(VcertA)) of the specific smart contract SC(VcertA) as an initial state, and a process of registering the PrivTxidA and the specific state S(SC(VcertA)) with a State Database (SDB), and (iv) a process of, if one or more anchoring conditions for an n-th block of a blockchain in the private blockchain database are satisfied, acquiring a specific representative hash value or its processed value calculated by using a specific hash value and its corresponding at least one neighboring hash value to be recorded in the n-th block with the specific hash value, wherein the specific hash value is calculated by using the specific public key PubA, the IdhashA and the specific byte code BC(SC(VcertA)), and wherein the neighboring hash value includes (iv-1) at least one first associated hash value calculated by using at least one associated public key, at least one Idhash_OTHERS which is a hash value of personal information of at least one of other users and at least one associated byte code into which at least one associated smart contract is compiled, and (iv-2) at least one second associated hash value of the SDB or of all variations of the SDB, wherein (iv-2-a) all the variations of the SDB include all respective changes of all states of smart contracts, and correspond to a difference between states of the SDB at a time of completion of the n-th block and states of the SDB at a time of completion of an (n−1)-th block of the blockchain in the private blockchain database, (iv-2-b) the states of the SDB are identifiable by all PrivTxids which represent respective location information of transactions and on where their corresponding transactions are recorded in the n-th block, and (iv-2-c) the SDB includes information on the specific state and at least one associated state of the associated smart contract, and (v) a process of registering the specific representative hash value or its processed value with a public blockchain database.

35. The intermediate server of claim 34, wherein the processor further performs or supports the another computer device to perform (vi) a process of, if the specific public key PubA, the IdhashA and the specific byte code BC(SC(VcertA)) are registered with the private blockchain database, transmitting the PrivTxidA and a response indicating a registration to a certain server to thereby instruct the certain server to transmit a completion message to the user computer device indicating the registration of the specific certificate, wherein the completion message includes the PrivTxidA.

36. The intermediate server of claim 34, wherein the anchoring conditions include at least one of (i) a condition that a certain number of the specific hash value and the neighboring hash value are acquired or generated, (ii) a condition that a certain amount of time is elapsed, (iii) a condition that the n-th block is created in the private blockchain database, and (iv) a condition that has at least one of characteristics of services.

37. The intermediate server of claim 36, wherein the processor records or supports the another computer device to record an SDB header hash value in a block header of the n-th block when the n-th block is created in the private blockchain database, and wherein the SDB header hash value is a hash value calculated by using information on the states of the SDB or all the variations of the SDB.

38. The intermediate server of claim 37, wherein, at the process of (iv), on condition that (I) a certificate representative hash value is generated from a Merkle tree whose leaf nodes include hash values calculated by using public keys, personal information hash values, and byte codes, and (II) a message representative hash value is generated from a Merkle tree whose leaf nodes include hash values calculated by using (II-1) message data which include approval information or their processed values corresponding to approvals of certificates, or revocation requesting information or their processed values corresponding to revocations of the certificates, the certificates being referred to by locators of transactions, (II-2) signature values of the message data, and (II-3) the locators, and (III) the certificate representative hash value and the message representative hash value are further recorded in the block header of the n-th block, the processor registers or supports the another computer device to register the SDB header hash value, the certificate representative hash value and the message representative transaction hash value or their processed values with the public blockchain database, wherein the public keys include the specific public key PubA and the associated public key, which are used as elements for calculating hash values recorded in the n-th block, wherein the personal information hash values include the IdhashA and the Idhash_OTHERS, which are used as elements for calculating hash values recorded in the n-th block, wherein the byte codes include the specific byte code BC(SC(VcertA)) and the associated byte code, which are used as elements for calculating hash values recorded in the n-th block, and wherein the locators include the PrivTxidA and the PrivTxids in the n-th block.

39. The intermediate server of claim 37, wherein, at the process of (iv), on condition that a private representative hash value is generated from a Merkle tree whose leaf nodes include (I) hash values calculated by using public keys, personal information hash values, and byte codes, and (II) hash values calculated by using (II-1) message data which include approval information or their processed values corresponding to approvals of certificates, or revocation requesting information or their processed values corresponding to revocations of the certificates, the certificates being referred to by locators of transactions (II-2) signature values of the message data, and (II-3) the locators, and (III) the private representative hash value is further recorded in the block header of the n-th block, the processor registers or supports the another computer device to register the SDB header hash value, the private representative hash value or their processed values with the public blockchain database, wherein the public keys include the specific public key PubA and the associated public key, which are used as elements for calculating hash values recorded in the n-th block, wherein the personal information hash values include the IdhashA and the Idhash_OTHERS, which are used as elements for calculating hash values recorded in the n-th block, wherein the byte codes include the specific byte code BC(SC(VcertA)) and the associated byte code, which are used as elements for calculating hash values recorded in the n-th block, and wherein the locators include the PrivTxidA and the PrivTxids in the n-th block.

40. An intermediate server for providing an approval service of a specific certificate based on a specific smart contract, wherein the specific smart contract is at least one source code capable of being compiled into at least one specific byte code executable on at least one computer device, is configured to perform a predetermined procedure if particular conditions are satisfied at a time of execution and wherein integrity about a result of the execution is verified by a consensus outputted from the computer device, comprising:

a processor, on condition that
- (A) a specific public key PubA corresponding to a user computer device of a specific user,
- (B) an IdhashA which is a hash value of personal information of the specific user,
- (C) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with a State Database (SDB), and
- (D) an approval request of the specific certificate is acquired directly or indirectly, wherein the approval request is a message requesting an approval of the specific certificate based on the specific smart contract SC(VcertA), for performing or supporting another computer device to perform
  - (i) a process of transmitting the PrivTxidA and a Transaction ID (TI), which includes information on a subject of an approval, created in response to the approval request, to the user computer device, and a process of instructing the user computer device to sign the TI or its processed value (TI') with a specific private key PrivA corresponding to the specific public key PubA to thereby generate a signature value SigPrivA(TI or TI'),
  - (ii) a process of validating the specific certificate by referring to the SigPrivA(TI or TI'), the TI or its processed value TI', and the PrivTxidA,
  - (iii) if the specific certificate is determined as valid,
    - (iii-1) a process of registering the SigPrivA(TI or TI'), the TI or its processed value TI', and the PrivTxidA, as an approval data of the specific certificate with the private blockchain database,
    - (iii-2) a process of executing the specific byte code BC(SC(VcertA)) on the computer device, and
    - (iii-3) a process of updating a specific state S(SC(VcertA)) of the SDB to a new state S'(SC(VcertA)) by referring to a result acquired from the process (iii-2), and
  - (iv) a process of, if one or more anchoring conditions for an n-th block of a blockchain in the private blockchain database are satisfied, acquiring a specific representative hash value or its processed value calculated by using a specific hash value, which is a hash value of the approval data, and its corresponding at least one neighboring hash value to be recorded in the n-th block with the specific hash value, wherein the neighboring hash value includes
    - (I) at least one first associated hash value calculated by using at least one associated public key, at least one Idhash_OTHERS which is a hash value of personal information of at least one of other users and at least one associated byte code into which at least one associated smart contract is compiled,
    - (II) at least one second associated hash value of the SDB or of all variations of the SDB, wherein
      - (II-1) all the variations of the SDB include all respective changes of all states of smart contracts, and correspond to a difference between states of the SDB at a time of completion of the n-th block and states of the SDB at a time of completion of an (n−1)-th block of the blockchain in the private blockchain database,
      - (II-2) the states of the SDB are identifiable by PrivTxids which represent all respective location information of transactions and on where their corresponding transactions are recorded in the n-th block, and
      - (II-3) the SDB includes information on the specific state and at least one associated state of the associated smart contract, and
  - (v) a process of registering the specific representative hash value or its processed value with a public blockchain database.

41. The intermediate server of claim 40, wherein, before the process (i), the processor further performs or supports the another computer device to perform
- (i0') a process of, on condition that a first representative hash value, having been calculated by using a hash value of a former state of the SDB and its corresponding at least one neighboring hash value, is registered with the public blockchain database, and then if the approval request is acquired, determining whether a second representative hash value or its processed value corresponds to the first representative hash value or its processed value, wherein the second representative hash value is calculated by using a hash value of a current state of the SDB in the private blockchain database and the at least one neighboring hash value corresponding to the former state of the SDB, and wherein the former state of the SDB is a most recent state among a state at a time of registration of the specific certificate and at a time of latest approval thereof, and
- (i1') a process of determining that an integrity of the SDB is compromised if the second representative hash value or its processed value is determined as not corresponding to the first representative hash value or its processed value.

42. The intermediate server of claim 40, wherein, before the process (i), the processor further performs or supports the another computer device to perform (i0) a process of, on condition that a first representative hash value or its processed value, having been calculated by using (i) a hash value calculated by using the specific public key PubA, the IdhashA, and the specific byte code, and (ii) its corresponding at least one neighboring hash value, is registered with the public blockchain database, and then if the approval request is acquired, determining whether a second representative hash value or its processed value, which is calculated by using the specific public key PubA, the IdhashA, and the specific byte code, corresponds to the first representative hash value or its processed value, and (ii) a process of determining that an integrity of the specific certificate is compromised if the second representative hash value or its processed value is determined as not corresponding to the first representative hash value or its processed value.

43. The intermediate server of claim 42,
wherein, at the process of (i0), the processor performs or supports the another computer device to perform (i0-1) a process of acquiring the specific public key PubA, the IdhashA, and the specific byte code from the private blockchain database by using the PrivTxidA, and a process of referring to a certain transaction ID related to the PrivTxidA, and (i0-2) a process of acquiring an OP_RETURN message from the public blockchain database by using the certain transaction ID, and at the process of (i1), if the second representative hash value or its processed value is determined as not corresponding to the first representative hash value or its processed value included in the OP_RETURN message, the processor performs or supports the another computer device to perform determining that the integrity of the specific certificate is compromised.

44. The intermediate server of claim 40, wherein, the processor further performs or supports the another computer device to perform (vi) a process of transmitting a message to the user computer device indicating that an approval of the certificate is completed if the specific certificate is determined as valid.

45. An intermediate server for providing a revocation service of a specific certificate based on a specific smart contract, wherein the specific smart contract is at least one source code capable of being compiled into at least one specific byte code executable on at least one computer device, is configured to perform a predetermined procedure if particular conditions are satisfied at a time of execution and wherein integrity about a result of the execution is verified by a consensus outputted from the computer device, comprising:

a processor, on condition that (A) a specific public key PubA corresponding to a user computer device of a specific user, (B) an IdhashA which is a hash value of personal information of the specific user, (C) a specific byte code BC(SC(VcertA)) into which a specific smart contract SC(VcertA) corresponding to a VcertA which includes one or more validity conditions on the specific certificate is compiled, are recorded at a location indicated by a PrivTxidA which is a locator of a specific transaction registered with a private blockchain database, and that the PrivTxidA and a specific state S(SC(VcertA)) of the specific smart contract SC(VcertA) are registered with a State Database (SDB), and (D) a revocation request of the specific certificate is acquired, wherein the revocation request is a message requesting for a revocation of the specific certificate based on the specific smart contract SC(VcertA), for performing or supporting another computer device to perform (i) a process of transmitting the PrivTxidA and a Revocation Request (RR), which includes information on the revocation request, created in response to the revocation request, to the user computer device, and a process of instructing the user computer device to sign the RR or its processed value RR' with a specific private key PrivA corresponding to the specific public key PubA to thereby generate a signature value SigPrivA(RR or RR'), (ii) a process of validating the specific certificate by referring to the SigPrivA(RR or RR'), the RR or its processed value RR', and the PrivTxidA, (iii) a process of, if the specific certificate is determined as valid, registering the SigPrivA(RR or RR'), the RR or its processed value RR', and the PrivTxidA, as a completion data of the revocation of the specific certificate with the private blockchain database, and (iv) a process of, if one or more anchoring conditions for an n-th block of a blockchain in the private blockchain database are satisfied, acquiring a specific representative hash value or its processed value calculated by using a specific hash value, which is a hash value of the completion data of the revocation, and its corresponding at least one neighboring hash value to be recorded in the n-th block with the specific hash value, wherein the neighboring hash value includes at (iv-1) at least one first associated hash value calculated by using at least one associated public key, at least one Idhash_OTHERS which is a hash value of personal information of at least one of other users and at least one associated byte code into which at least one associated smart contract is compiled, (iv-2) at least one second associated hash value of the SDB or of all variations of the SDB, wherein (iv-2-a) all the variations of the SDB include all respective changes of all states of smart contracts, and correspond to a difference between states of the SDB at a time of completion of the n-th block and states of the SDB at a time of completion of an (n−1)-th block of the blockchain in the private blockchain database, (iv-2-b) the states of the SDB are identifiable by PrivTxids which represent respective location information of transactions and on where their corresponding transactions are recorded in the n-th block, and (iv-2-c) the SDB includes information on the specific state and at least one associated state of the associated smart contract, and (v) a process of registering the specific representative hash value or its processed value with a public blockchain database.

46. The intermediate server of claim 45, wherein, at the process of (ii), the processor performs or supports the another computer device to perform a process of determining whether the completion data of the revocation of the specific certificate is registered, and a process of transmitting a message to the user computer device indicating that the revocation of the specific certificate failed if the completion data of the revocation is determined as registered.

47. The intermediate server of claim 45, wherein, after the process of (iii), the processor performs or supports the another computer device to perform a process of determining whether the PrivTxidA or its processed value acquired directly or indirectly from the user computer device is registered, and a process of transmitting a message to the user computer device indicating that the revocation of the certificate failed if the PrivTxidA or its processed value is determined as not registered.

* * * * *